(12) United States Patent
Thomas

(10) Patent No.: US 8,482,601 B2
(45) Date of Patent: Jul. 9, 2013

(54) METHOD AND APPARATUS FOR 3-D ELECTRON HOLOGRAPHIC VISUAL AND AUDIO SCENE PROPAGATION IN A VIDEO OR CINEMATIC ARENA, DIGITALLY PROCESSED, AUTO LANGUAGE TRACKING

(76) Inventors: Walter Carl Thomas, Austin, TX (US); Presley Jordan Thomas-Wayne, legal representative, Austin, TX (US)

(*) Notice: Subject to any disclaimer, the term of this patent is extended or adjusted under 35 U.S.C. 154(b) by 554 days.

(21) Appl. No.: 12/831,884

(22) Filed: Jul. 7, 2010

(65) Prior Publication Data

US 2010/0328424 A1    Dec. 30, 2010

Related U.S. Application Data

(63) Continuation of application No. 10/958,371, filed on Oct. 6, 2004, now abandoned.

(51) Int. Cl.
    *H04N 13/02* (2006.01)
(52) U.S. Cl.
    USPC .......................................................... 348/49

(58) Field of Classification Search
    USPC .......................................................... 348/49
    See application file for complete search history.

(56) References Cited

U.S. PATENT DOCUMENTS

| | | | | |
|---|---|---|---|---|
| 5,760,827 A * | 6/1998 | Faris | ................................. | 348/42 |
| 5,835,133 A * | 11/1998 | Moreton et al. | ................ | 348/49 |
| 6,038,071 A * | 3/2000 | Chikazawa | ..................... | 359/464 |
| 6,335,755 B1 * | 1/2002 | McLaine et al. | .................. | 348/47 |
| 7,162,153 B2 * | 1/2007 | Harter et al. | ................... | 396/331 |

* cited by examiner

*Primary Examiner* — Mehrdad Dastouri
*Assistant Examiner* — Joseph Sanford
(74) *Attorney, Agent, or Firm* — Dentons US LLP

(57) ABSTRACT

A system and method for displaying images in three dimensions. The system may include a dual axis four lens system, four LCD switching elements, a pair of LCD switched dual filtered dichroic mirrors, and a pair of half silvered dichroic color filter elements, and two charge coupled device pickups. The system may process light through a number of axis to produce optical disparity for presenting three dimensional video.

12 Claims, 23 Drawing Sheets

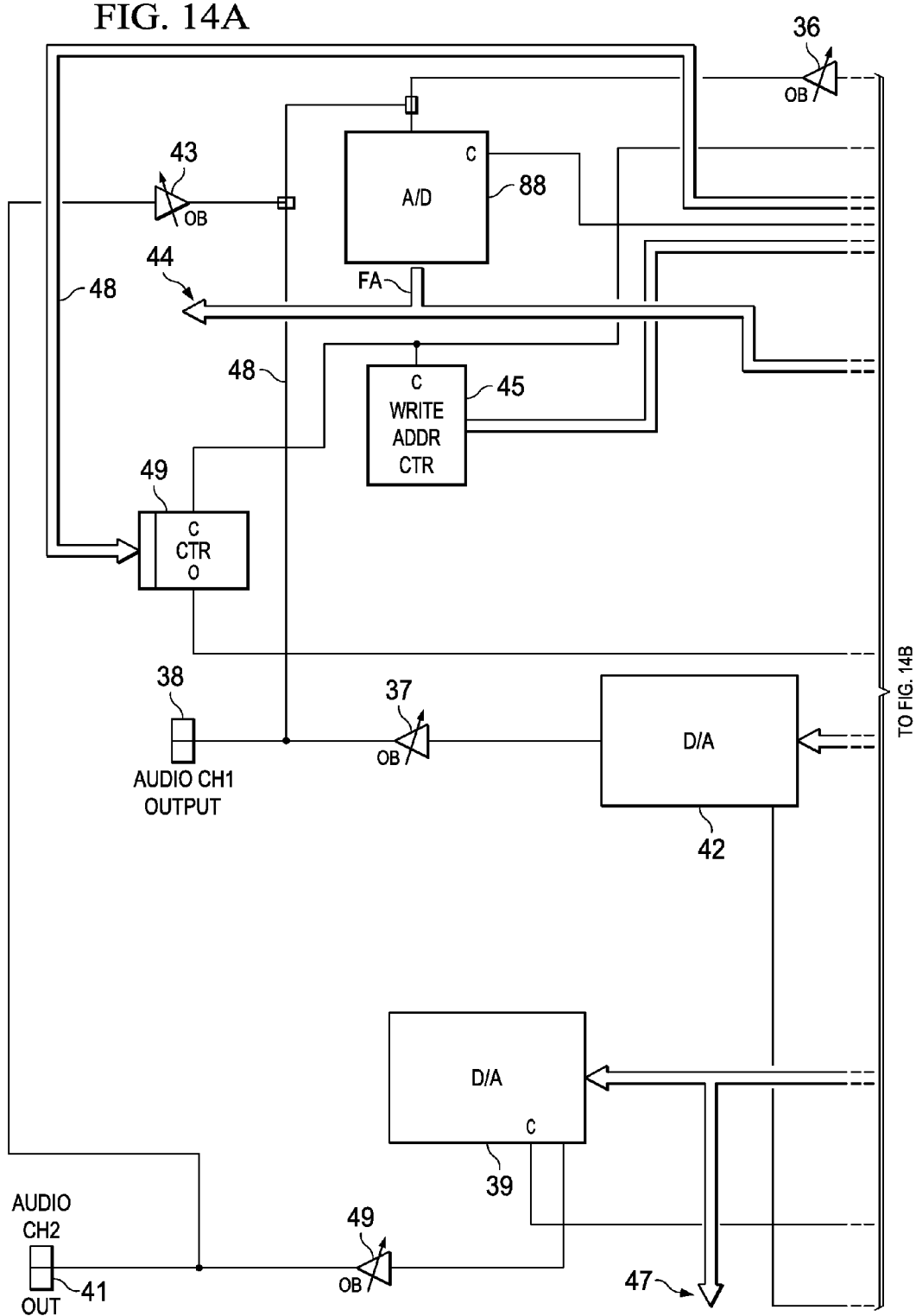

METHOD AND APPARATUS FOR 3-D ELECTRON HOLOGRAPHIC VISUAL AND AUDIO SCENE PROPAGATION IN A VIDEO OR CINEMATIC ARENA, DIGITALLY PROCESSED, AUTO LANGUAGE TRACKING

RELATED APPLICATIONS

This application is a continuation of U.S. patent application Ser. No. 10/958,371, filed Oct. 6, 2004 now abandoned, entitled "METHOD AND APPARATUS FOR 3-D ELECTRON HOLOGRAPHIC VISUAL AND AUDIO SCENE PROPAGATION IN A VIDEO OR CINEMATIC ARENA, DIGITALLY PROCESSED, AUTO LANGUAGE TRACKING", which is hereby incorporated by reference herein.

FIELD OF THE INVENTION

This invention lies in the field of television signal generation and processing. More particularly it concerns a system for generating and processing TV signals from a visual scene, in which a three dimensional effect can be observed in the displayed TV signals, with a mirrored LCD switched selective color optically oriented digitally controlled light path system, and properly oriented optical axes of the three camera tubes or CCD optical pickups, which by digitally or analog modulation, alternately muting the signals from a first, second and third tube or CCD pickups which are adapted to pass the output of the first, second, and third tube or CCD optical pickups which are adapted to pass the first, second and/or third primary colors or secondary colors, including:

DESCRIPTION OF THE PRIOR ART

In the moving picture industry, displays of moving pictures have been prepared and displayed for observation with a three-dimensional effect. This has been accomplished by using two separate cameras, with optical axes spaced apart and nominally parallel, but converging at a selected small angle. The light reaching each camera is filtered with one or the other of two primary colors. The corresponding pictures are displayed sequentially, while the observer watches the display with eye glasses, in which one glass passes the first primary color and the second glass passes the second primary color.

In the moving picture industry to obtain the three dimensional effect requires essentially doubling the photographic apparatus and doubling the number of frames of film which are prepared and projected. This doubling of cost has had an affect on the acceptance of the process, which apparently makes the process uneconomical.

Prior art utilized only sequential single muting of one of two selected primary colors. This produced excellent dimensionally but destroyed color balance. Also, the combination of the 3rd non-switched light beam (green in this example) to the other 2 optical axes caused a shadow or double image which the coded glasses could not remove, causing dizziness and discomfort for the viewer. The new art in this filing is characterized in that a primary light beam is passed in conjunction with the passage of a corresponding secondary light beam thus producing perfect color balance, and removing blurred double imagery, and the need for coded viewing glasses. In the field of film or television, the applicants are unaware of any prior art in which a three-dimensional moving display does not require special coded glasses to view a three-dimensional effect.

SUMMARY OF THE INVENTION

It is the primary object of this invention to provide a modification of the conventional television or film camera system so that a television picture can be generated and processed, such that the display of that picture on a television receiver or moving film projection can be viewed in three-dimensional visual display without the aid of encoded glasses.

It is a further object of this invention to provide a method to reproduce or print this process to photographic moving film process displays or to static 3-D plate magazine print process.

It is a further object of this invention to provide a modification of the television receiver to provide a pseudo three-dimensional display.

It is a still further object of this invention to provide:
1. 3-D Pseudo reformatting formats in tape to tape, film to tape or film to tape and back to film, for theater release in variable wide screen formats including the following additional feature and formats:
  a. 3-D no glasses display,
  b. Virtual Vision 3-D CCD LCD glasses display,
  c. Joy stick zoom and location control,
  d. High definition (digital line doubling) with wide screen variable smart reformatting, in variable aspect ratios from 3-4, 9-16, 1-2, and any other aspect ratio configuration as desired,
  e. 3-D wide digital controlled lens camera with variable aspect ratio formats additional features as listed in the above formats,
  f. A holographic method of digital real-time automatic language track translation process.

It is the primary object of this invention to provide a modification of the TV camera and processing apparatus to make possible three-dimensional viewing of the received and displayed signal, while making it possible also to view the display in a conventional manner in two-dimensional presentation.

These and others objects are realized and the limitations of the prior art are overcome in this invention by utilizing a conventional television camera, characterized in that an added mirrored LCD switched digitally controlled light path system, utilizing corresponding primary and secondary phased light paths, in which there are three video camera tubes or CCD pickups C1, C2, and C3, receiving light along three different optical axes A1, A2, and A3, which are spaced apart and are nominally parallel to each other in a horizontal plane. Axis A1 is filtered with filter F1 to pass a first primary color to C1. Similarly, axis A2 is filtered with a filter F2 to pass the camera C2 a second primary color, such as green, and the third optical axis A3 is provided with a filter F3 to pass to the camera C3 the third primary color, such as blue. The outputs of the three camera tubes or CCDs C1, C2, and C3 are processed with video amplifiers V1, V2, and V3 in a conventional manner.

A conventional camera control is used which provides a synchronizing buss that sequences two sub-sweeps, or sub-rasters, which are interleaved. During a first raster, the output of the first and second video amplifier carrying the red and green signal is muted, or cut off, or disabled and during the second sub-raster the corresponding output of the video amplifier V3, carrying the blue signal is cut off or muted. Otherwise the three output signals from the video amplifiers are processed in a normal manner to provide a conventional television signal to the transmitter, and eventually to a receiver.

The inventors have discovered that to have a properly color balanced picture or display, that only complementary primary and secondary colors should be alternately switched or muted. In the receiver there will be on a first raster a picture displayed which will be deficient in red and green, and on the second raster there will be a picture displayed deficient in blue and so on. When these series of pictures are observed through eye glasses (OR NO GLASSES REQUIRED WHEN HOLOGRAPHICALLY MUTED AS SHOWN IN THE PREFERRED EMBODIMENT) in which one lens is yellow, (the complementary or secondary of blue) and one lens is blue (the complementary of the secondary color yellow), the display will have a three dimensional character, dependent on the directions of the optical axes of the 1st and 2nd lens.

The principal difference between this invention and the conventional camera is, that at least one of the three optical axes representing the three primary colors must be rotatable toward the other two. Preferably two optical axes, the first and third should be rotatable towards the center one.

This type of operation can be provided with either one lens, or with two or three separate lenses. The simplest to conceive of is the one in which a separate lens is used in each of the three optical axes. Of course the lenses will be controlled together so that their focus and their zoom will be in step with each other, but their optical axes will not be precisely parallel, as they would be in the conventional camera.

In second embodiment, two lenses can be used. One lens is in the first, or red optical axis. The other is in the third or blue optical axis one or the other, or both lenses supply the green light to the central or second optical axis.

The system can also be used with one lens. In the case of the single camera lens, the three optical axes are formed out in front of the lines by use of appropriate mirrors and filters and possible simple lenses. Then the conventional mirrors and filters are used behind the lens and ahead of the camera tubes.

A further part of this invention lies in an apparatus modification on a television receiver, which is receiving conventional television signals taken with a single lens, and with the three optical axes precisely parallel. In this embodiment means are provided for alternately muting the red and the green signal from the video amplifiers in the receiver, to the control guns in the tube. If desired one or the other of the red and blue signals can be delayed with respect to the other one, to give the impression of a three-dimensional viewing situation.

DESCRIPTION OF THE DRAWINGS

THESE AND OTHER OBJECTS AND ADVANTAGES OF THIS INVENTION, AND A BETTER UNDERSTANDING OF THE PRINCIPLES AND DETAILS OF THE INVENTION WILL BE EVIDENT FROM THE FOLLOWING DESCRIPTION, TAKEN IN CONJUNCTION WITH THE APPENDED DRAWINGS IN WHICH:

FIGS. 8-1 to 8-3 illustrates the primary embodiments which utilizes a four lens diachroic filter arrangement digitally switched muting control of the primary and secondary light beams to achieve dimensionality.

FIGS. 14A and 14B is a pictorial representation of a circuit for stereo holographic output in accordance with an illustrative embodiment.

Figure 1:
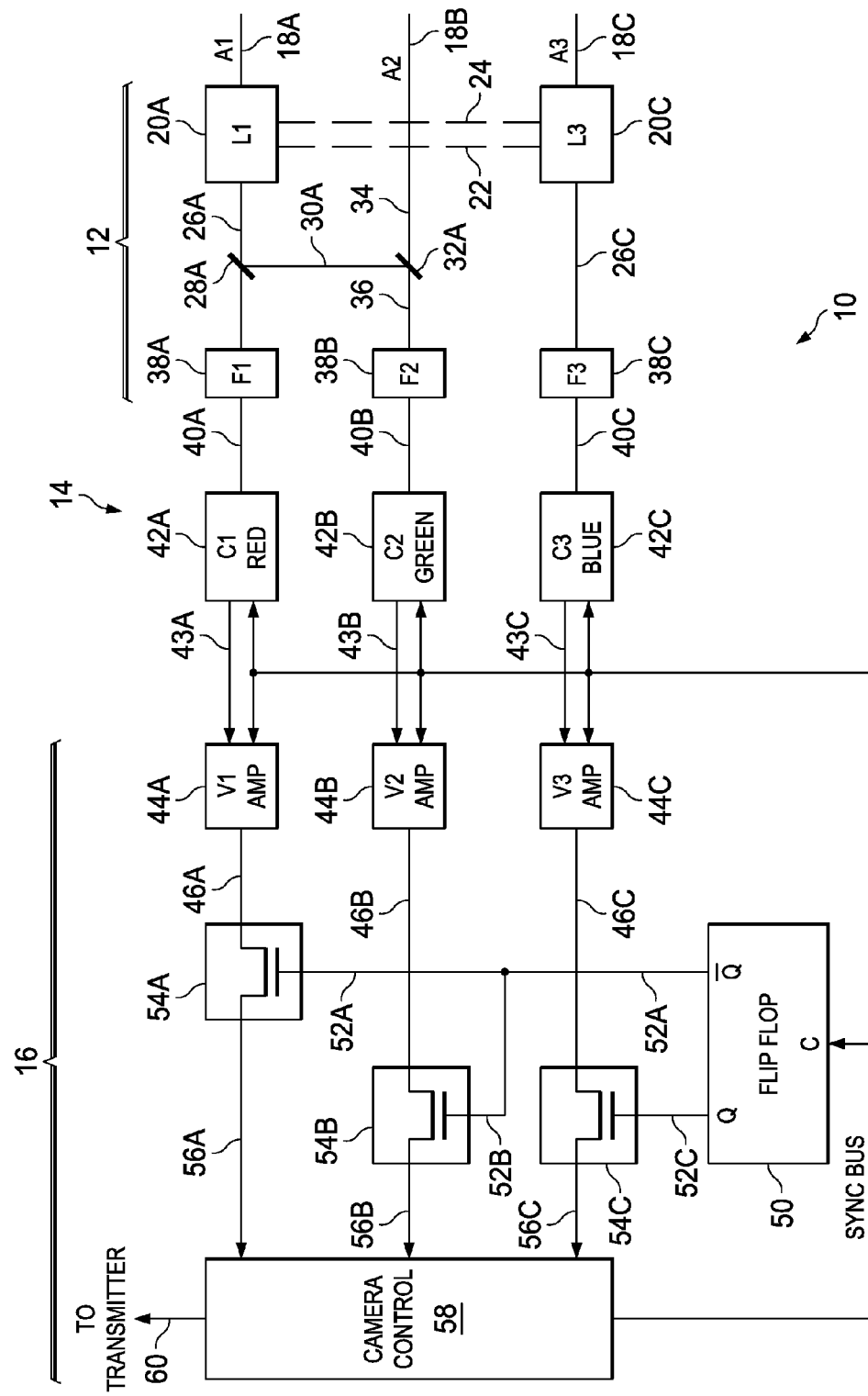
FIG. 1 is a schematic block diagram of the modified television camera, adapted to transmit processed primary and secondary color muted signals which can be displayed and viewed in three dimensions.

Referring now to the drawings, and in particular to FIG. 1, there is shown one embodiment of this invention indicated generally by the numeral 10. This is a schematic block diagram, in which there are several parts. The lens and filter portion indicated generally by the numeral 12, the separate color video camera tubes, indicated generally by the numeral 14 and the video amplifiers and procession apparatus, indicated generally by the numeral 16.

In the conventional television camera there are three video camera tubes or CCD pickups, each one adapted to pass and process one of the three primary colors, such as, for example, red, green and blue. In FIG. 1, the first camera tube or CCD pickup C1, number 42A processed the red light, camera tube or CCD pickup C2, number 42B processes the green light and the third camera tube C3, 42C processes the blue light. The lines 18A, 18B and 18C represent the three optical axes. They are nominally parallel, and spaced apart a selected distance. When precisely parallel to each other, they will not transmit a three-dimensional signal. It is only when one or both of the outer optical axes A1 and/or A3 is rotated, so that it intersects the center optical axis A2 at some selected distance in front of the camera, that the appearance of a three-dimensional picture will be evident. The details of rotating the optical axis will be discussed in connection with FIG. 5.

In FIG. 1 two camera lenses are shown L1, numeral 20A and L3, numeral 20C, respectively in the optical axes A1 and A3. The dash lines 22 and 24 represent control means, which tie together the two lenses L1 and L3. After that the optical axis moves into the camera by the precise position of the video camera tubes can be altered by the use of mirror, etc. However, for convenience and other reasons and without limitation the three video camera tubes or CCD pickups C1, C2 and C3 will be described as co-axial of the lenses L1 and L3. As the axis A1 is rotated the lens and the camera tube will be rotated together, as will be described in connection with FIG. 5. However, by the same means as in FIG. 5, the camera tube can remain stationary while the axis rotates.

Consider the optical axis 18A. Light from a distant scene, off to the left, arrives at the lens L1 and passes through the lens to be intercepted by partially silvered mirror 28A which passes part of the light through filter F1, numeral 38A and axis 40A to the camera tube 42A. The filter F1 will, for example, be such as to pass only the first primary color, red. The output signal of the camera 42A passes by leads 43A to the first video amplifier 44A for processing.

Part of the light deflected by mirror 28A passes as beam 30A to partially reflecting mirror 32A. This light is diverted through beam 36, filter F2, numeral 38B and beam 40B, to the second video camera tube or CCD optical pickup 42B. Here the filter F2 is selected to pass the second of the primary colors such as green, for example.

Along optical axes 18C light from the scene arrives to the lens 20C and passes through the lens as beam 26C that passes the light to the filter F3 numeral 38C, beam 40C to the third video camera tube 42C. The filter F3 is designed to pass the third of the primary colors, namely blue, for example. The output of the video camera C3 goes by leads 43C to the video amplifier B3 for processing.

A camera control 58 is provided as is customary in the video camera and no detail of this control is required since the conventional control can be used. This camera control 58 provides signals to the video amplifiers and to the camera tubes to control the synchronization of that raster sweeps in all of the camera tubes and amplifiers. The camera control means 58 will provide two subscans interlaced, as in the conventional TV system. The sync buss 48 is connected also to a flip flop 50 which is responsive to the synchronizing signal 48 is set to provide a Q' output on 52C, during one subraster and a Q output of 52A during the second raster. On the first subraster the Q output of flip flop 50 via lead 52A causes (red, for example) video amplifier V1 to pass its output on lead 46A to an analog switch 54A. Simultaneously via led 52B the video amplifier V2 passes its video signal (green, for example) to analog switch 54B, and the output of the switch 54B goes by lead 46BA to the camera control. Thus by a combination of the two signals 56A and 46B a corresponding secondary light video signal (yellow, for this example) is passed to the camera control. When there is a positive signal on lead 52A, the analog switch 54A will pass video signals (red for this example) on lead 46A to the camera control 58 and simultaneously in exactly the same way via lead 46B the signal foes from video amplifier V2 through analog switch 54B through lead 56B to the camera control 58. On the other hand, when there is no signal on lead 52A, the switches 54A and 54B will block the transmission of video signals from 46A and 46B to the camera control.

Similarly when there is a positive signal on lead 52C, the signal from the video amplifier 44C, will go by lead 46C to the analog switch 54C, through lead 56C to the camera control. However when a logical zero appears on the lead 52C, the switch 54C is opened or disabled, and there is no (blue for this example) video signal output from the video amplifier 44C to the camera control.

It is therefore clear that the flip flop and the analog switches act as a synchronized switches, and other kinds of switches could be used, so (for this example) that on the first raster the red and green signals are passed but no blue signal and on the second raster the blue signal is passed, but no red and green signals are passed.

Figure 7:
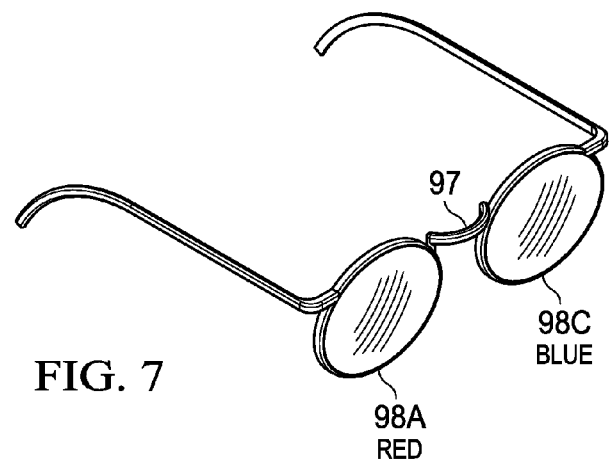
FIG. 7 illustrates modified eye glass through which the three-dimensional picture can be optionally viewed for virtual vision helmet application.

The three video signals on leads 56A, 46B and 56C are then processed in the camera control to provide the transmitted signal 60 to the transmitter, and eventually to a television receiver will look like any conventional picture in three colors and will be two dimensional. However, if as shown in FIG. 7 a pair of eye glasses 97 are provided, in which one lens 98A is red passing glass, and the lens 98C in the other part of the eye glass 97 is blue passing glass, then the right and left eye will ultimately see the blue picture and the red picture which are not precisely aimed at the same scene and therefore will show a three-dimensional optical effect.

Figure 2:
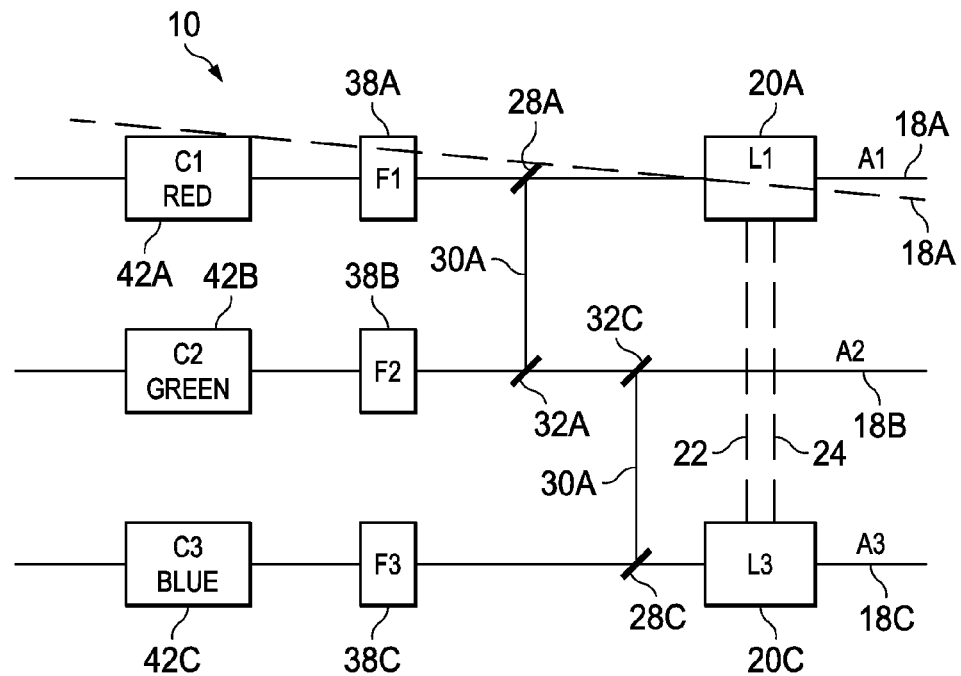
FIGS. 2, 3, and 4 illustrate different embodiments of lenses in order to utilize the three-dimensional display.
Figure 3:
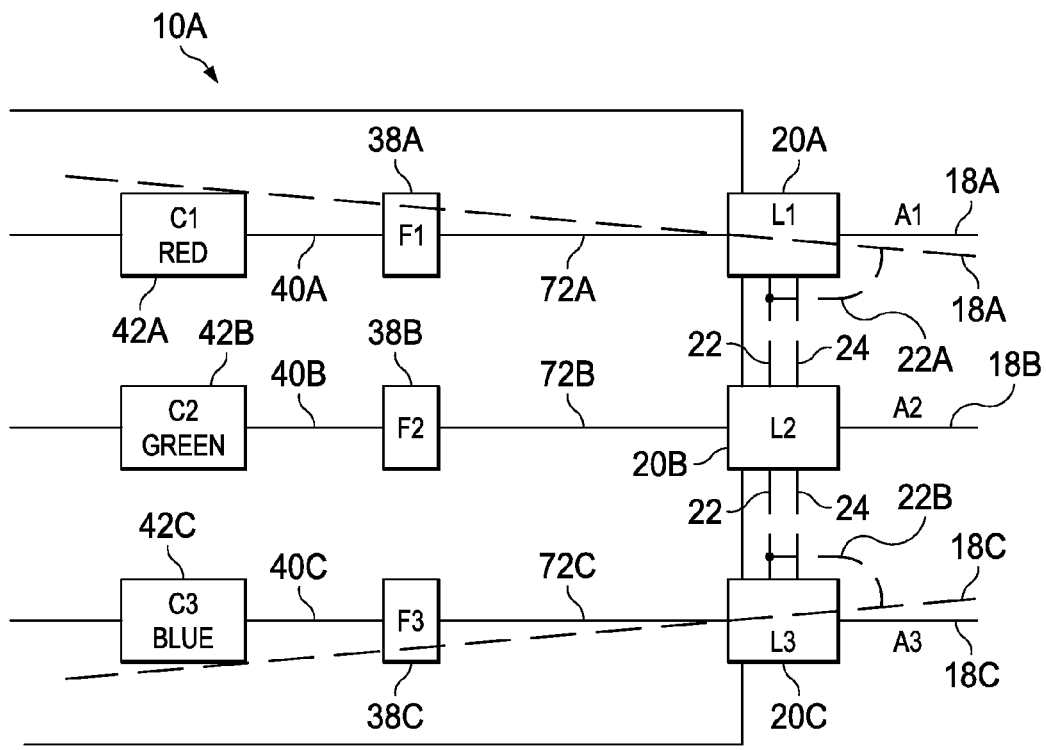
Figure 4:
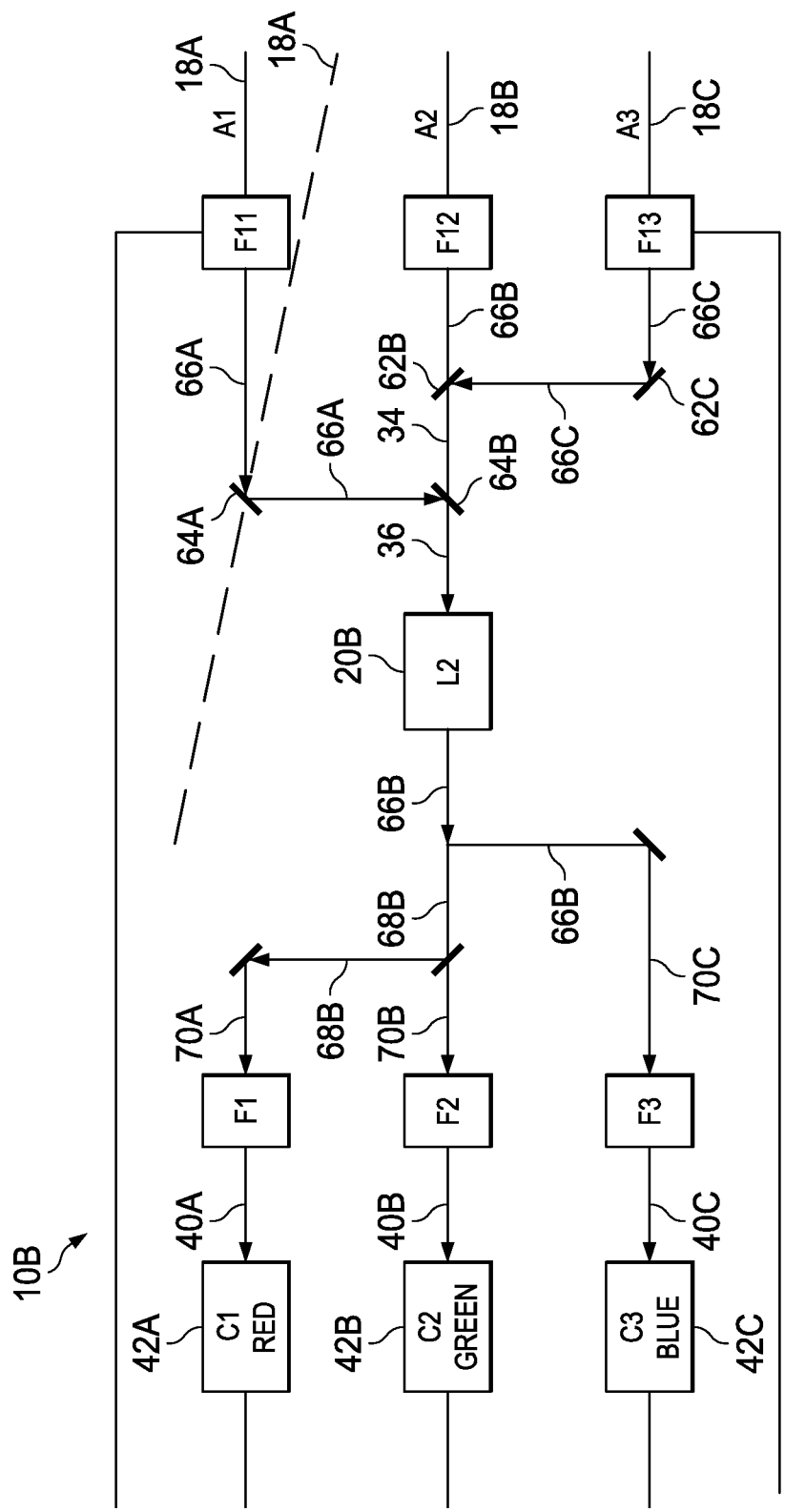

The lens and camera portions of the system of FIG. 1 have been repeated in FIGS. 2, 3, and 4, which show respectively the use of two lenses 20A and 20C, in FIG. 2 substantially identical to that of FIG. 1. In FIG. 2 the axis 18A is shown tilted inwardly in accordance with the dash line 18A. The description of FIG. 2 is substantially identical to the portion of FIG. 1 and will not be repeated.

In FIG. 3 the lens and video camera tube and filter portions of the system of FIG. 1 are reproduced, except that in FIG. 3 there are now three lenses L1, L2 and L3, respectively numbered 20A, 20B and 20C, which define the three optical axes 18A, 18B and 18C. The three lenses L1, L2 and L3 are tied together by controls 22 and 24 as in the case of FIG. 1, so that they will track each other on focus and zoom. No internal mirrors are needed and each lens supplies the light for one of the video cameras C1, C2 and C3. The filters F1, F2 and F# are identical to those in FIG. 1, and the action is substantially as described for FIG. 1. In FIG. 3 the rotation of the two outer axes 18A and 18C indicates that the two outer axes are rotated inwardly at an angle such as to intersect the center optical axis 18B at a selected distance in front of the camera. These could be controlled manually as automatically or mechanically in response to the focus control 22. This automatic control is shown by the dashed lines 22A, 22B from the control 22 to the optical axes 18A' and 18C'. FIG. 4 is another embodiment of the lens and camera tube section indicated generally by numeral 10B. Here a single lens L2 is utilized and all of the light going to the three video tubes 42A, 42B and 42C are supplied by the single lens L2, by means of semi-transparent mirrors, as is done in the conventional video camera. Thus the beam 66B is broken up into two parts 66B' which supplies the beam 70C through filter F3 to the third camera C3. Another part of the light in beam 66B goes as beam 68B to a second partially reflecting mirror which diverts part of the light as beam 68B' to another completely reflecting mirror and to the filter F1 and to the first video tube C1. Here again the filter F1 passes red light to the video camera tube. The remaining part of the beam 66B goes as beam 70B to filter F2 which passes green light to the second video camera tube 42B.

The main improvement in this embodiment is out in advance of the lens where there are three spaced apart filters and spaced apart substantially parallel optical axes 18A, 18B and 18C. The filter F11 passes red light similarly to FIG. F1 to the lens. Filter F12 passes green light and is a substantially identical to filter F2. Filter F13 passes blue light similar to that of filter F3. Thus filter F11 is in the optical axis A1 which passes light of the first primary color through a fully reflecting mirror 64A through a partially reflecting mirror 64B to the lens L2. Similarly the third optical axis 18C passing through the filter F13 passes a blue light as beam 66C to fully reflecting mirror 62C, to partially reflecting mirror 62B, and on through to the lens L2 and to the green second camera C2. The green light is defined by axis 18B and passes through filter F12 and two partially reflecting mirrors 62B and 64B through the lens L2 and through two additional partially reflecting mirrors, to the filter F2 and to the second video camera tube. It will be clear that a simple lens co-axial with each of the axes 18A, 18B and 18C preferably in advance of the filters F11, F12 and F13 may serve to better define the three optical axes.

Again, if the axes 18A, 18B and 18C are precisely parallel, there will be no three-dimensional optical effect; however, if the axis 18A is rotated inwardly as shown by the dash line 18A' there will be some contribution to three dimensionality of the display.

One of the problems of rotation of the optical axis in conjunction with the use of mirrors is important since the light passed through filter F11 must be precisely focused and positioned with the other two light components, even though the axis 18A is rotated. To do this the axis 18A' is rotated at the center of the mirror 64A as shown.

Figure 5:
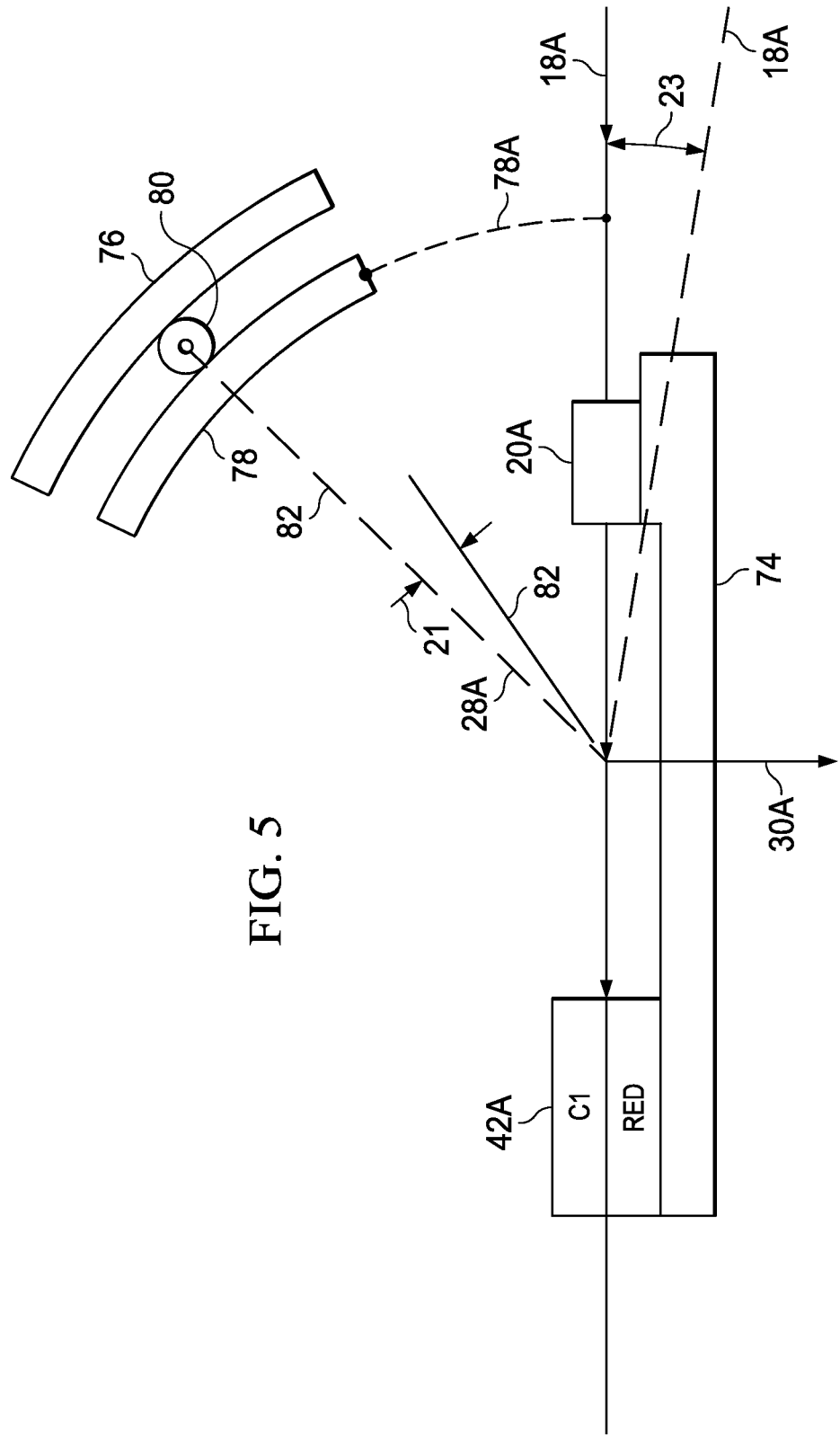
FIG. 5 illustrates a detail of the rotation of the optical axes.

Referring now to FIG. 5 which is designed around the schematic diagram of FIG. 4, the nominal direction of the optical axis 18A is shown, and the rotated axis 18A' is shown. The center of rotation is at the center of the mirror 28A. In the drawing the element 76 is a stationary circular concave rack, and 76 is a circular convex rack, which is attached to and moves with the axis 18A as shown by the dashed line 78A. Numeral 8C represents a small pinion positioned between the two racks 76 and 78. As the rack 78 moves through a selected angle, say 10 degrees, the pinion 80 will move only half that distance. Thus as the axis 18A rotates to 18A' the plane 82 of the mirror 28A will rotate to 82" through an angle 21 just one-half of angle 23.

As the axis 18A is rotated, and drives the rack 78 the mirror 28A will follow in proper angle, so that the entering light through the lens 20A will be precisely in the same beam 30A, even though the axis does change. Thus the picture passed through the beam 30A to the second camera tube will not move even though the optical axis changes.

As shown in FIG. 1 green light is supplied to the camera C2 from lenses L1 and L3. While the pictures will be stationary in view of the rotation of the axes 18A and 18C, the pictures that are represented will be slightly different and therefore there may be some minor blurring in the yellow picture in which case one of the other mirrors 28A or 28C can be removed so that the green light is supplied only by one lens L12 or L3.

In order to utilize the improved camera system of FIGS. 1, 2, 3, and 4, all that is needed to view the reproduced pictures in the receiver is the eye glass 97 shown and described in FIG. 7. If the glasses of FIG. 7 are not used, then the picture produced by the television signals from FIG. 1 will look like any conventional television signal and will be only two-dimensional.

Figure 6:
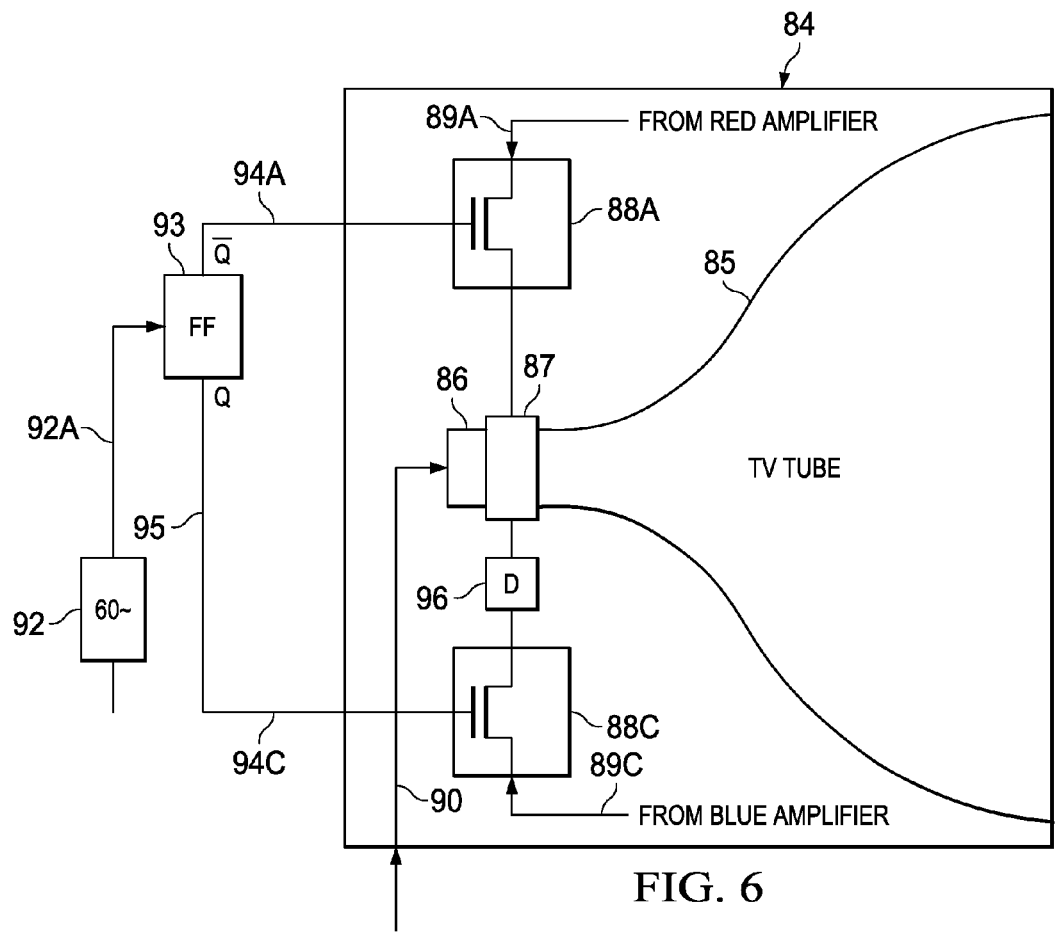
FIG. 6 illustrates a further embodiment which invites a modification of the television receiver circuit.

Referring now to FIG. 6 there is shown an embodiment in which the television receiver is modified to provide a pseudo three-dimensional viewing. There will only be a two-dimensional, although there may be a psychological effect suggestive of three dimensionality. The actual TV transmitted picture, arrives on lead 90 to the TV tube 85 in the receiver 84f. This is strictly a two dimensional picture as is conventional. However, what has been done is to take a synchronizing signal either from the TV circuit on lead 90, or from the local power system, 60 cycle power 92, which drives, through lead 92A, a flip flop 93. This flip flop through the Q and Q' outputs, control two analog switches, 88A and 88C. These switches sequentially control and mute the red signal, and then the blue signal; one in one sub-raster, and the other in the other sub-raster. Thus the video amplifier outputs, on lead 89A, the red signal, which goes through the switch 88A to the coupling unit 87, to control the red gun. But the Q and Q' signals alternately mute the red and the blue by putting a high signal, or logical one, on the lead 94A to enable the red signal, or on 94C to enable the blue signal. If desired 89C (or in lead 89A) an analog phase shift or delay register 96 can be inserted in the lead so that the display of the blue signal (or the red signal) will be delayed or phase shifted from the display of the other signal, and will psychologically provide an impression of three-dimensionality.

What has been described is an improvement in video camera and processing apparatus for generating television signals from a visual scene, such that these signals when reproduced in a receiver and viewed with colored glasses will give the impression of three dimensionality, to the picture displayed on a two dimensional surface.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

THE PRIMARY EMBODIMENT

Figures 1, 8:
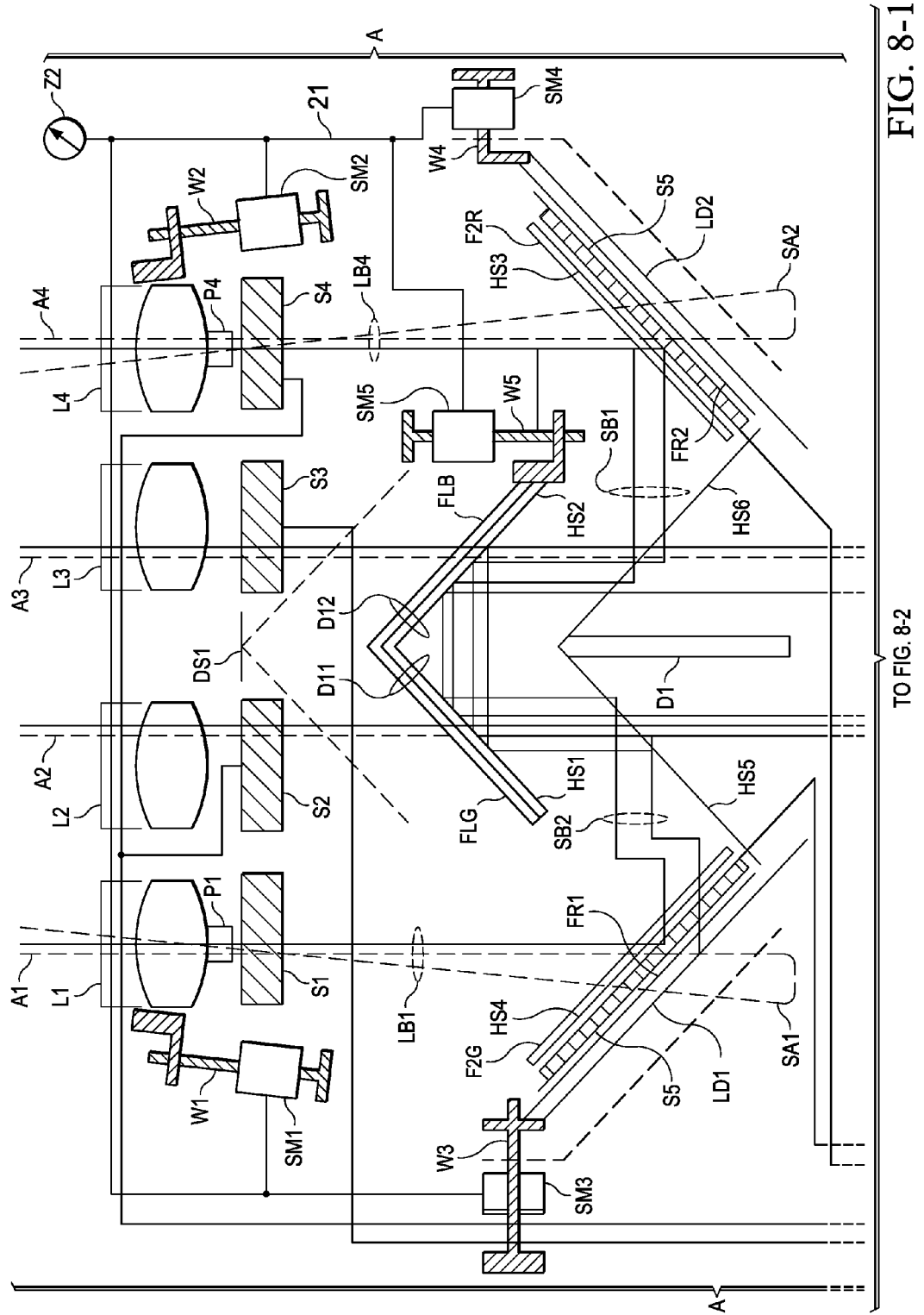
Figures 2, 8:
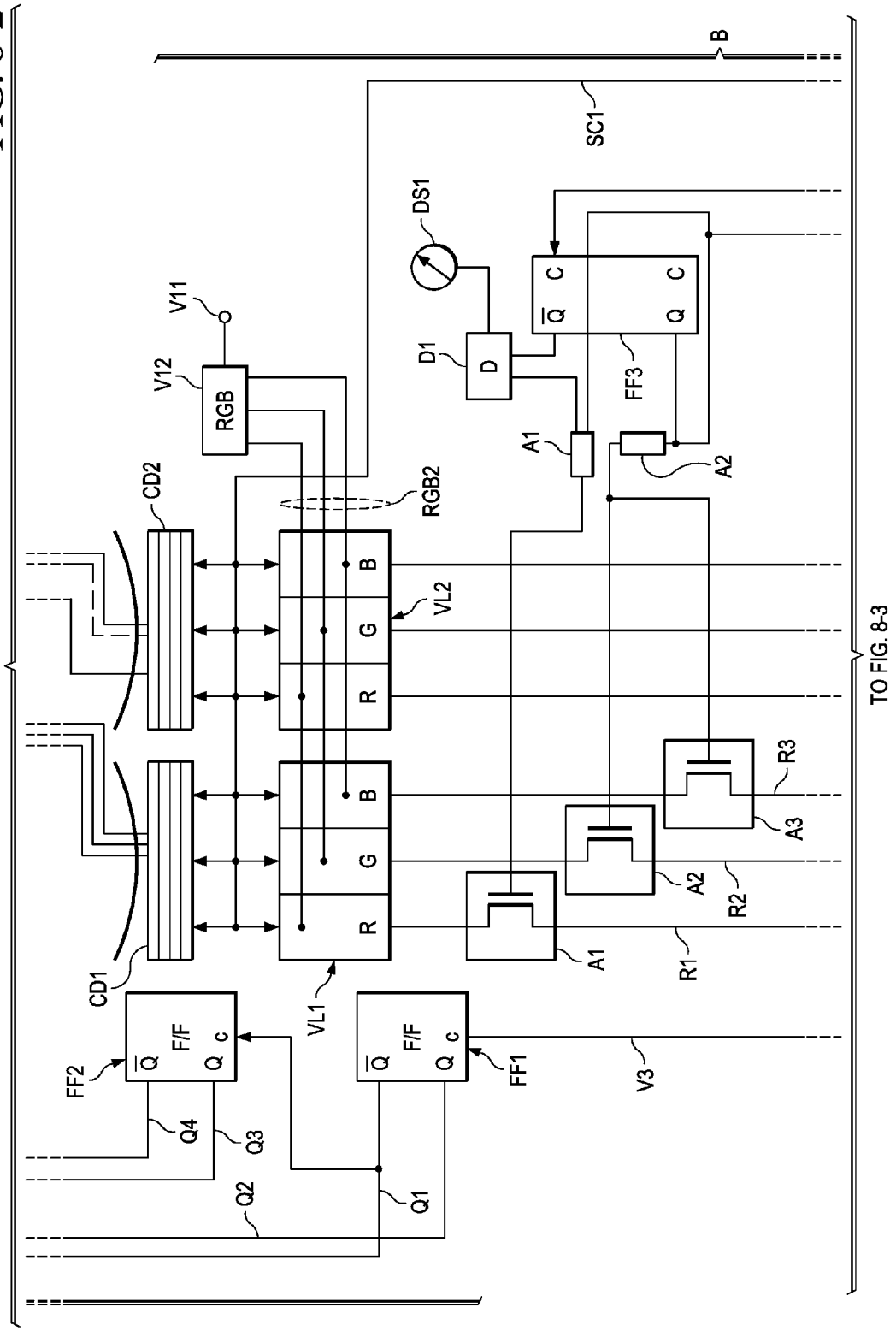
Figures 3, 8:
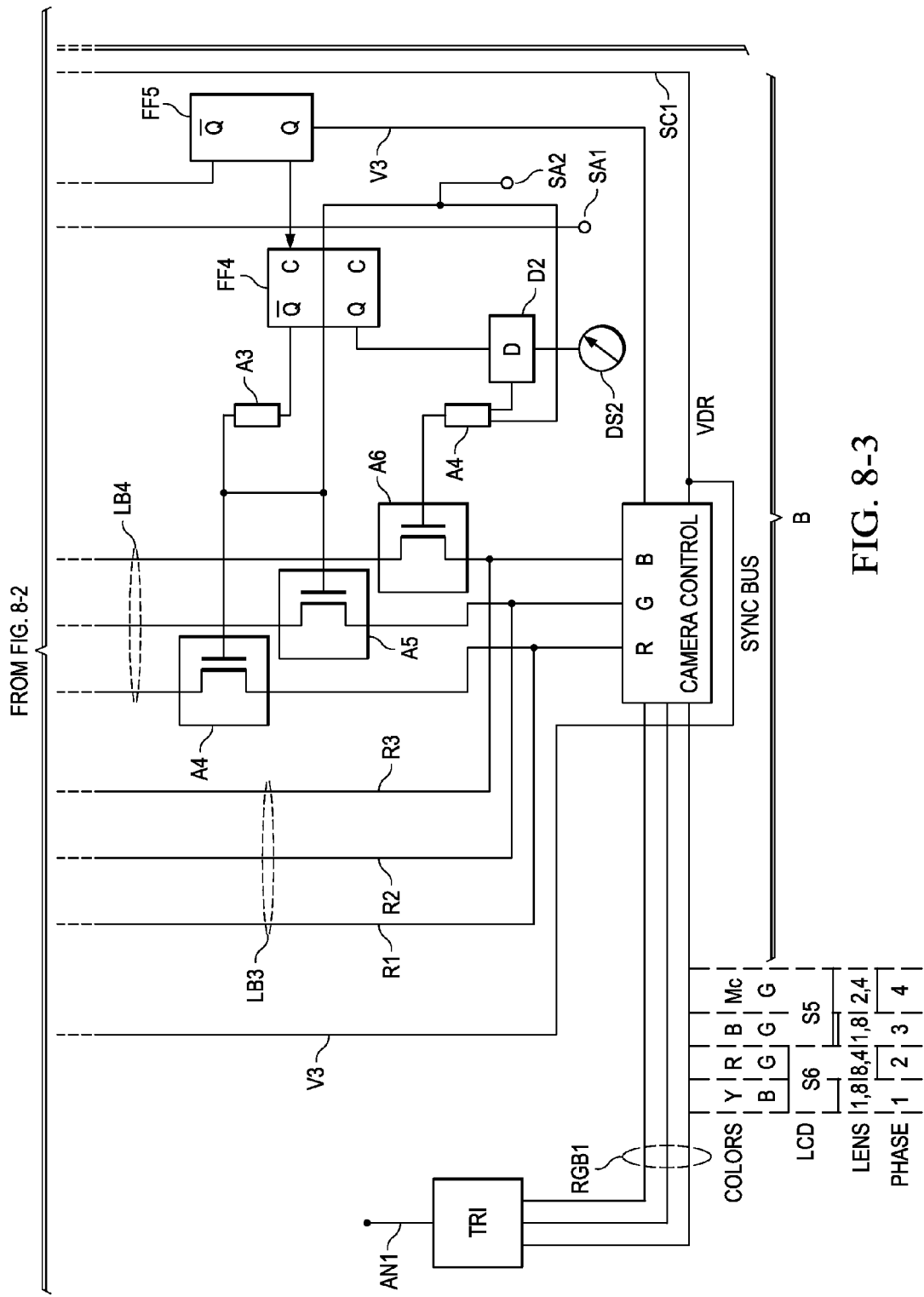

In FIGS. 8-1 to 8-3, the accomplishment of a true holographic muting lens camera system is utilized in this embodiment by implementation of an adjustable angled and muting switchable dual axis four lens system, L1, L2, L3 and L4, with LCD optical muting S1, S2, S3 and S4 and also utilizing the use of two 45 degree angled to the horizontal plane HP 1 color LCD switched dual filtered dichroic half silvered mirror and mirrored light path systems LD1 and LD2, two forward 45 degrees to the horizontal plane facing each other half silvered dichroic color filter elements DI1 and DI2, two 45 degree angled to the horizontal plane HP1 half silvered mirrors HS5 and HS6, two video pickup tubes or CCD RBG three color pickups CD1 and CD2, and additional high speed holographic muting (section B of FIGS. 8-1 to 8-3) before the combined RGB signals are routed to standard camera control circuitry.

Looking at FIGS. 8-1 to 8-3, a mirrored LCD switched digitally controlled light path system, utilizing corresponding primary and secondary SB2 and SB1 phased light paths, in which there are two full color video camera tubes or CCD pickups CD1 and CD2, receiving light along two different optical axes A2 and A3, which are spaced apart and which are nominally parallel to each other; and two additional light path axes A1 and A4, joined via half silvered mirrors hs1, hs2, hs4 and hs5 to light path axes A2 and A3. A1 and A4 light path axes are minutely angled SA1 and SA2 to each other in a horizontal plane, to produce optical disparity for dimension. The angle SA1 and SA2 of the two said axes being angle controlled to a small selected angle by 5 worm gears W1, W2, W3, W4 and W5 with synchronous step motors SM1, SM2, SM3, SM4 and SM5. Two of the said worm gears W1 and W2 are used to control the small selected angle SA1 and SA2 of the two outside lenses, L1 and L4 inwardly toward each other. Two additional worm gear W3 and W4 controls are used to adjust horizontal positioning of the outside dichroic dual filter mirror systems LD1 and LD2. The one remaining worm gear W5 is used to adjust the distance DS1 of the center front mirrored 90 degree V shaped reflecting half silvered internal filter dichroic mirrors DI1 and D12. These digital step controlled worm gears are functionally tied via lead Z1 to the synchronized zoom function control Z2 of the 4 lenses L1, L2, L3, L4 and L5 which are also synchronously focused and aperture controlled.

Figure 8A:
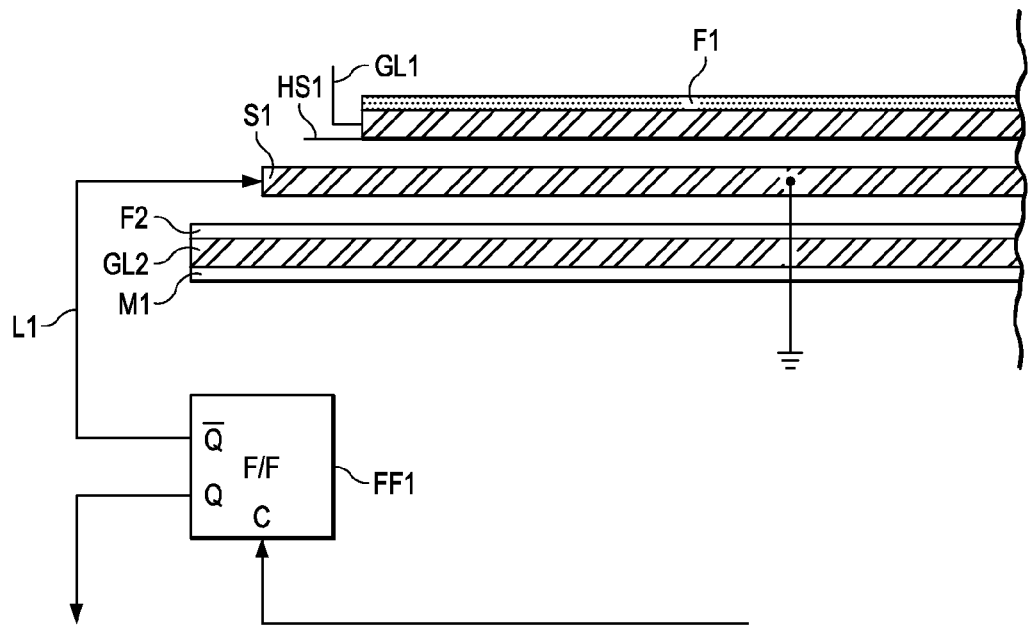
FIG. 8A is a pictorial representation of LCD switching dual mirrored primary and secondary dichroic filter elements in accordance with an illustrative embodiment.
Figure 8B:
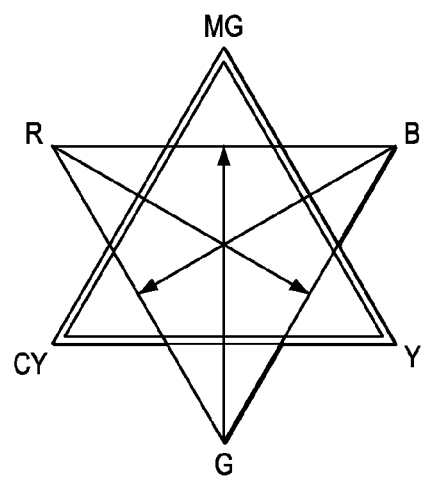
FIGS. 8B and 8C are pictorial representations of phase switching or muting patterns in accordance with an illustrative embodiment.

Again looking at FIGS. 8-1 to 8-3: Two mirrored LCD switched digitally controlled light path systems, utilizing corresponding primary LB2 and LB3 and secondary SB2 and SB1 phased light paths, in which there are two video camera tubes or CCD pickups CD1 and CD2, on axes A2 and A3, receiving light from the two different LCD optically switched S2 and S3 muted optical axes A2 and A3, and which are spaced apart and are nominally parallel to each other in a horizontal plane HP1. The said axes A2 and A3 additionally utilize light from light path systems originating from axes A1 and A4 as they are filtered and selectively digitally switch controlled by LCD optical switches selectively dual filtered to primary or secondary light beams by dichroic half silvered HS4 and HS3 light path reflecting mirror systems LD1 and LD2, to alternately provide by LCD optical light switch means primary and secondary light sources which are combined via half silvered mirrors hs1, hs2, hs4 and hs5 with primary light path axes A2 and A3 as light is LCD optical light switch controlled and combined from lenses L2 and L3 through dichroic filter elements DI1 and D12, to final read out by CCD RGB optical pickups CD1 and CD2. In FIG. 8A is a detailed look at the LCD Switching Dual Mirrored Primary and Secondary Dichroic Filter Element: a multiple element sandwich consisting of 2 sheets of coated glass, the first said glass element GL1 with a primary color filter gel coating F1 on the front and a half silvered mirror coating on the back HS1. The second plane of glass has a primary color filter gel coating F2 on the front and a fully silvered mirror coating M1 on the back of the said glass.

Sandwiched in between the two said coated pieces of mirrored glass is a full plate LCD optical element switch S1, which when empowered by a plus signal or pulse via lead L1 to the clock enable input of the said LCD S1, momentarily goes full plane opaque or optically transparent for the duration of the pulse width of said flip flop FF1 or digital pulse output L1.

When the said LCD light switch S1 is not enabled by said control pulse lead L1, the LCD light switch S1 turns off and blocks all light from going through the plane of the said LCD light switch S1. Thus a primary light beam is reflected back out as same color as the primary gel F1.

Alternately when the said LCD switch S1 is enabled with a positive going pulse from said lead L1, the LCD optical switch S1 goes opaque allowing the light beam SL2 to continue through S1 through the gel coating F2, glass plane GL2, to strike the fully silvered mirror coating M1 to fully reflect outward completely as secondary light beam SL2.

Figure 8C:
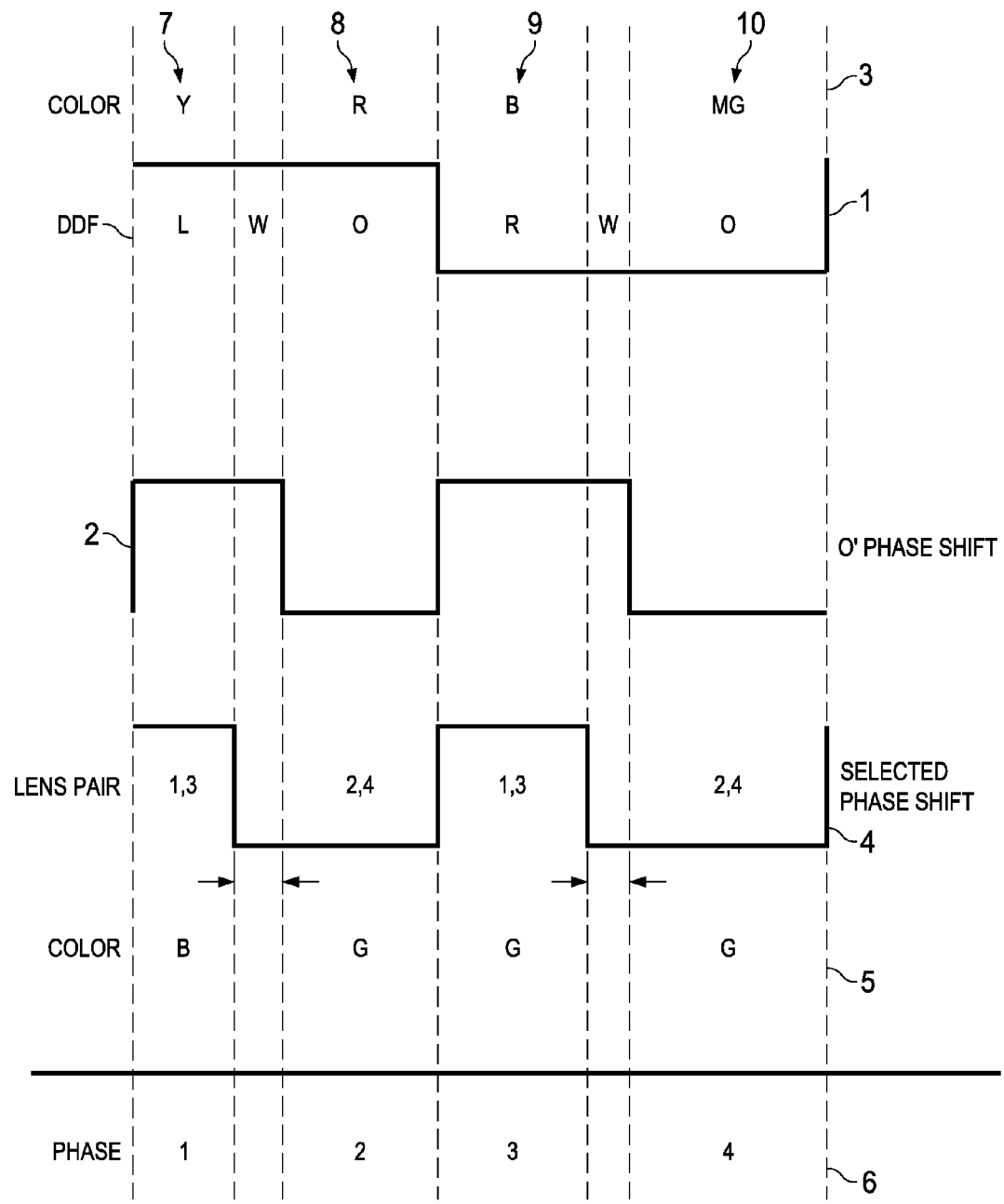

In FIG. 8C is described and illustrated the 4 phase switching or muting patterns of Starcam (FIGS. 8-1 to 8-3 herein described as Starcam). Muting of the primary and secondary light beams is shown as they are activated by the 2 phase control flip flops (FF2 and FF1 of FIGS. 8-1 to 8-3). The four phases are shown by column 7, 8, 9, 10. Column 7 reveals that in phase 1 Starcam admits and processes on axis 1 (A1 of FIGS. 8-1 to 8-3) a yellow filtered beam via (LD1 of FIGS. 8-1 to 8-3) and combines it, via half silvered mirrors HS5, HS1 and HS2 with a blue filtered light beam from (A3 of FIGS. 8-1 to 8-3) axes 3 through half silvered mirror HS6 to the right optical CCD pickup CD2.

Similarly, phase 2 (column 8) shows the green light beam from axis 2 via half silvered mirror HS1 and color gel FLG, combined with light from lens 4, axis 4 (L4 and A4 of FIGS. 8-1 to 8-3) via half silvered mirror HS3, HS6, HS2 and HS1 to optical RGB CCD pickup CD2 for camera processing.

Phases 3 and 4 similarly emit phased corresponding primary and secondary light holographic beams for processing to the high speed holographic muting of FIGS. 8-1 to 8-3 section B to the camera control, according to the chart as shown in FIG. 8C.

Dual CCD Ultra Vision Hood

In the prior art of hood or helmet viewing of television signals the apparatus is bulky and heavy and apparently expensive to build, and does not receive conventional television signals.

Figure 9:
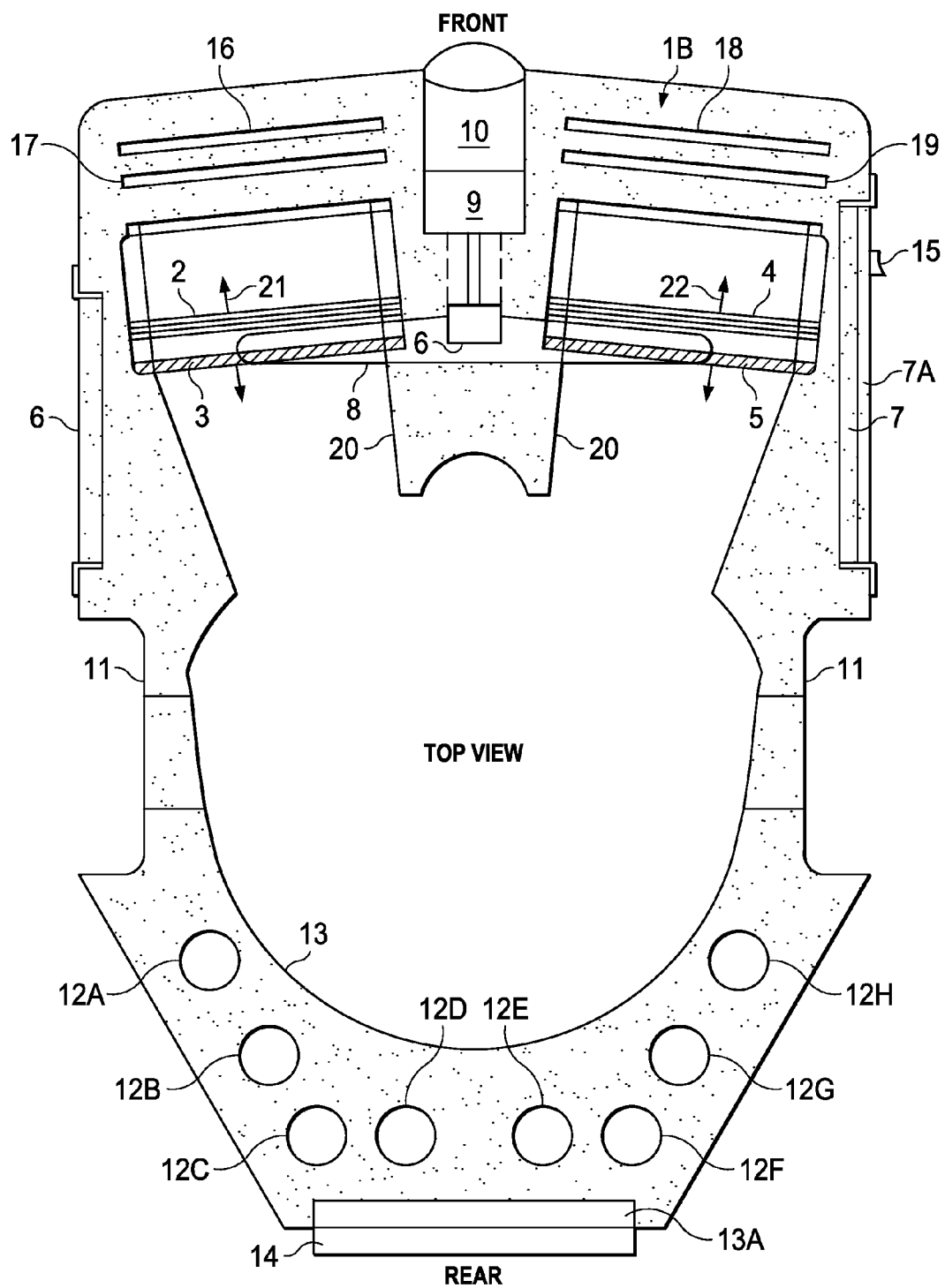
FIG. 9 illustrates a top view of a holographic vision hood for 3D viewing in accordance with an illustrative embodiment.

Looking at FIG. 9: By utilizing the above described Starcam holographic processing of video signals and a new high density light weight styrofoam casing to house the LCD switching elements 3 and 5, and CCD display elements 2 and 4, and an improved focusing system that automatically aligns the viewing area of the CCD display elements 2 and 4 when adjusted by one single rocker switch which activates an internal step motor 9 and worm gear assembly 9 and 6 and bracket 8 to allow the viewer to focus the LCD, CCD elements incorporated with the electronic holographic switching of the dual LCD switches 3 and 5 and dual CCD elements 2 and 4 as shown in the above described Starcam System (FIGS. 8-1 to 8-3 section B) allows for normal video signals to be converted into a three-dimensional display commonly described as Virtual Vision, allowing 3-D Virtual Vision Viewing of a Visual Scene from either signals from the Starcam System or nominal video signals comprising;

Description of the Drawing FIG. 9

Figure 9A:
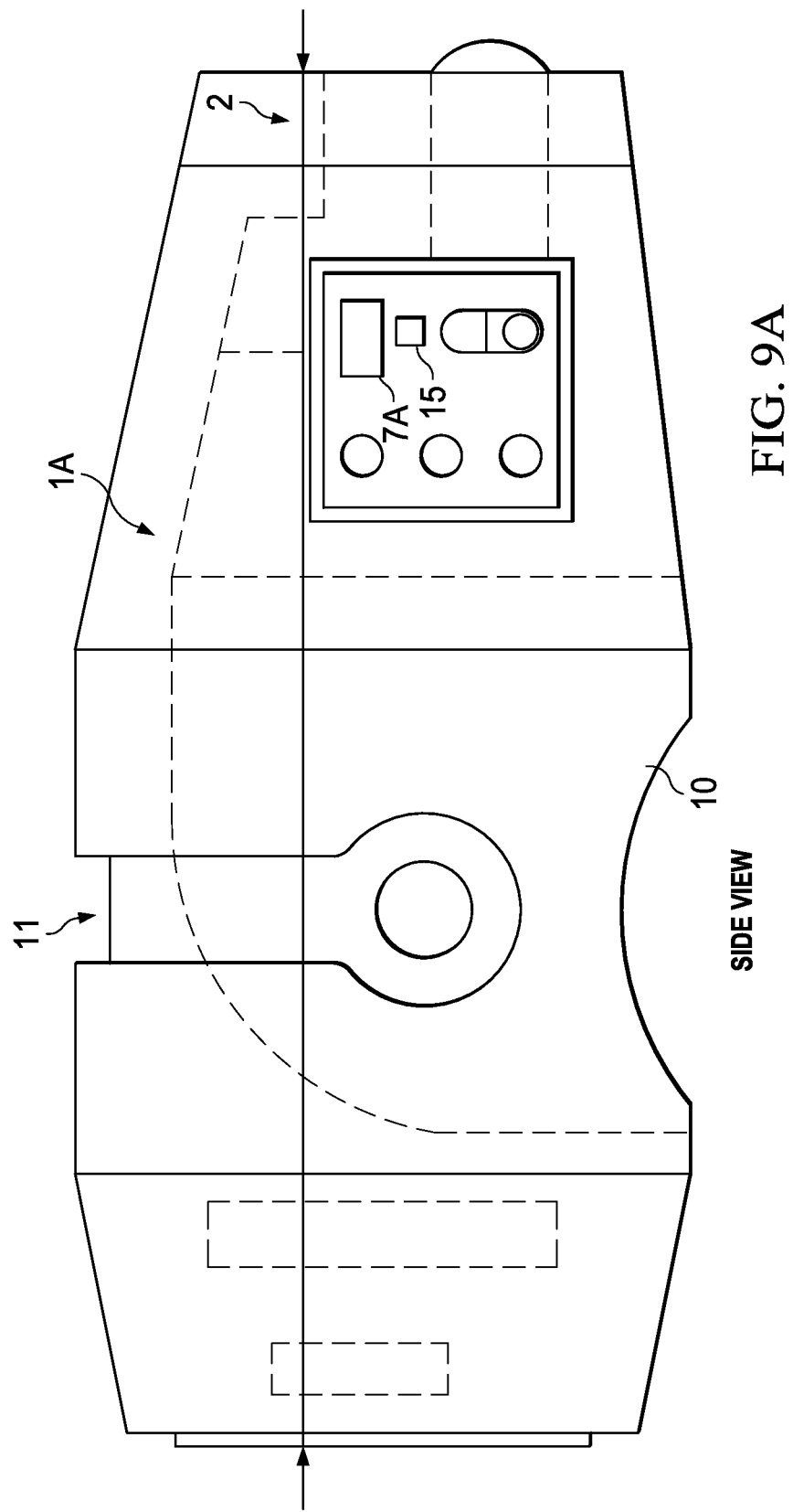
FIG. 9A illustrates a side view of a holographic vision hood for 3D viewing in accordance with an illustrative embodiment.

The dual CCD Ultra Vision Hood for viewing visual scenes in 3-D Holovision is compatible with the above described primary embodiment Starcam System, of FIGS. 8-1 to 8-3, herein referred to as The StarCam System, comprising a light weight styrofoam hood element FIG. 9 and FIG. 9A that is horizontally cut into two sections (1*a* and 1*b* of FIG. 9A) that can be separated (2 of FIG. 9A) for component insertion of the two CCD display devices 2 and 4 each positioned behind LCD digitally switched LCD optical switches 3 and 5, that when focused by a motor driven worm gear 6 attached to bracket 8 enables the CCD LCD assembly 2 and 3, 4 and 5 to adjust to viewer's eyes precisely at a correct angle 20 and distance and distance 21 and 22 required for a three-dimensional perception of a video scene when switched sequential in phase with an electron hologram signals (FIGS. 8-1 to 8-3, section B) generated as is the Starcam Camera System above described.

Also provided are video amplifiers 6 and 7 required by the two CCD-LCD display units shown inserted on either side of hood element.

Inserted in the front of hood element 1B is provided a wide angle lens and video camera system 10 which optionally may be turned on for viewing outside the hood area without removing the hood FIG. 9A element from the viewer's head.

Formed outside of the styrofoam hood element is provided an indenture 11 for a stereophonic audio headset of conventional head phones for receiving audio signals from the video source displayed by the CCD display elements 2 and 4 and LCD optical switches 3 and 5 inside the hood element. The audio amplifier 14 and FM receiver 13A is inserted outside the hood element in the rear behind the head hole 13 of the hood element 1B.

The power supply consists of 8 rechargeable batteries placed into 8 holes in the styrofoam mold situated in back behind the molded head hole 13. Replacement is accomplished by separating the hood element 1a and 1b of FIG. 9A.

A control panel 7a coordinates all the electronics of the dual CCD LCD hood system is located on the right front right side of the hood element indented into the styrofoam and includes rocker switch 15 for focusing the viewing of CCD-LCD viewing elements, positioned for ease of control of the viewer. The front slots 16, 17, 18 and 19 indented in the styrofoam casing 1b of the hood element 1b contain video processing electronics for processing nominal two-dimensional video signals into phased three-dimensional signals as described in the above shown Starcam Holographic Video System. (FIGS. 8-1 to 8-3, section B)

By utilizing the dual CCD-LCD elements of the Ultra Vision Hood System FIG. 9 A coupled with the holographic muting system as described in FIGS. 8-1 to 8-3 section B of the Starcam System, a holographic Visual Scene is displayed from video signals transmitted (TR1 of FIGS. 8-1 to 8-3) from the Starcam System.

For pseudo dimensional processing and display of two-dimensional video signals to 3-D holographic visual displays, a composite video signal may be imputed at VI1 of FIGS. 8-1 to 8-3 into the video processor V12 which outputs separate RGB signals into the holographic processor circuitry shown in section B of FIGS. 8-1 to 8-3, for 3-D holographic conversion for viewing in three-dimensions, and sequentially transmitted to the television receiver 13a, or by direct cable, or infrared room transmission of the video signal to the Ultra Vision Hood for signal processing and display of a visual scene in 3-D holography.

Figure 8D:
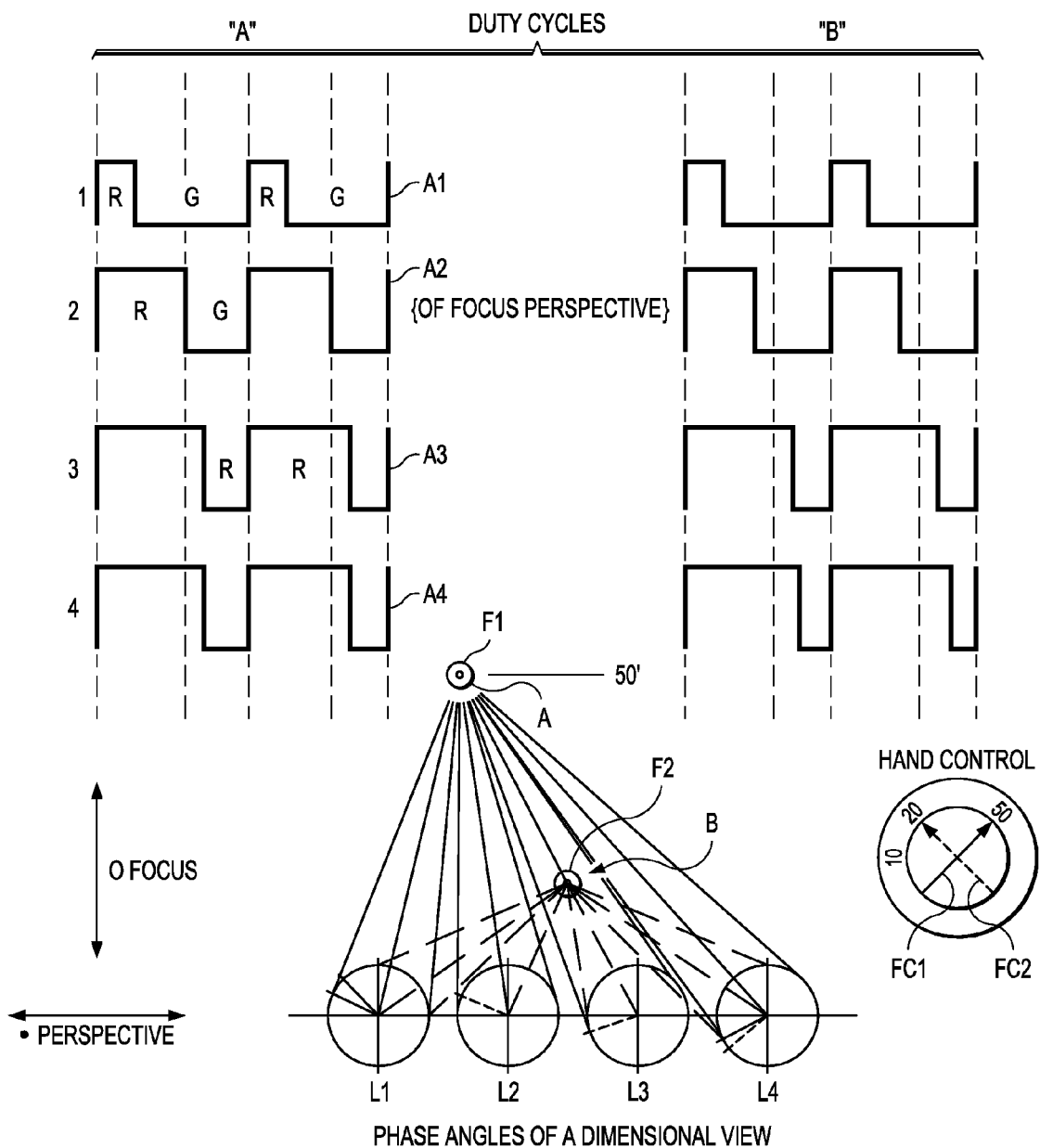
FIG. 8D is a pictorial representation of dimensional viewing based on phase angles in accordance with an illustrative embodiment.
Figure 8E:
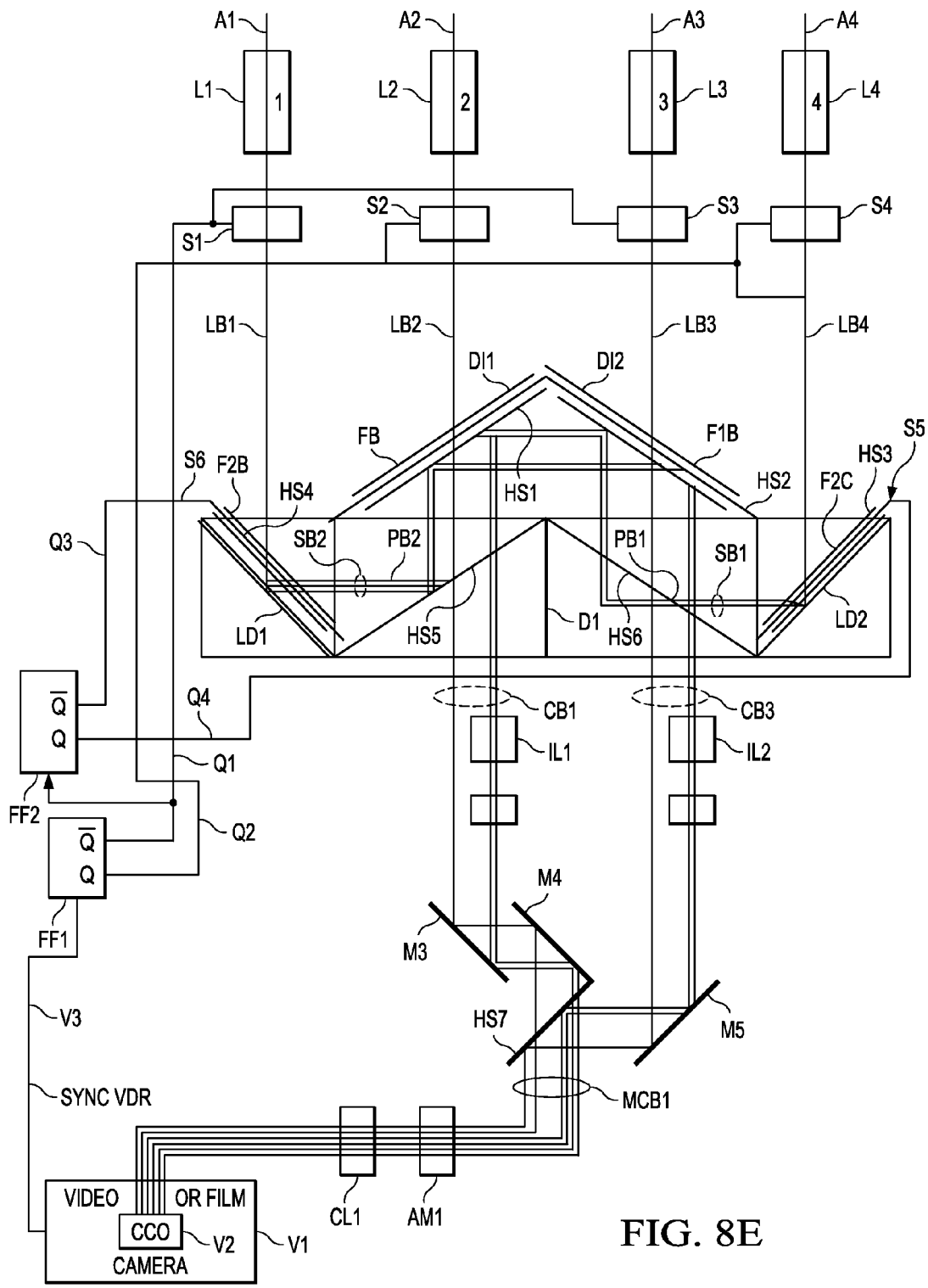
FIG. 8E is a pictorial representation of an embodiment of portions of the system of FIG. 8 in accordance with an illustrative embodiment.

Looking at FIG. 8D: The inventors have theoretically discovered that light photons have a left and right spin according to whether the light beams are coming in from left viewpoint perspective or a right viewpoint perspective, and that although the speed of light particles is constant the speed of said photo spin determines phase angle and color of light in dimensional perspective, and determines the perspective and distance of a particular imagery source. If the perspective is dead center then the phase angle of the photon is 0 degrees. If the perspective angle is coming from the right the spin of the photons will be clockwise. If the perspective is to left of a perpendicular line the phase spin of the photon will spin opposite. The point of focus and perspective will determine the phase angle and spin of the photon. From a reference of perpendicular line to the horizontal plane, a 90 degree line from the axis of perspective drawn from perspective point will indicate phase of the proton, and will reflect focus and depth of field. It is therefore possible to reproduce by the Starcam circuitry exact phasings, for dimensional perspective of a reflected light path visual scene, making it possible to generate real time or pseudo 3-D reproduction of a visual scene.

It is also shown by the inventors that the selected color phasings of the Starcam circuitry can reproduce perspective and dimensional depth of field.

As indicated by the drawing, the four lenses of Starcam each generate a particularly different phase relationship to the visual scene being photographed holographically. These phases are directly tied to the distance focusing and holographic perspective of the Starcam camera lenses.

In column "A" is shown examples of the holographic three-dimensional phasings and digital duty cycles generated by lenses at different optical axis angles on a horizontal plane when focus is set FC1 at nominally 50 feet. Lens one L1 will generate a digital duty cycle phasing as depicted in duty cycle A1. Assuming that this is the duty cycle of the output of a control flip flop which mutes the RGB of StarCam, a very small duty cycle for the red signal would limit the time for the transmission of the red signal while green would enjoy a considerably larger potion of the duty cycle timing of the said flip flop control signal. Lens L2 90 degrees to a horizontal plane axis demonstrates a perfectly square duty cycle. Thus the red and green muting cycles would perfectly equal. Lens L3 indicates a widening of the duty cycle of the said control flip flop. Lens L4 indicates even a more extreme unbalance of the duty cycle. Also note the slightly different phasings of perspective point B with focus set at 20 feet (f2 and FC2).

Variable high speed scanning of the primary and secondary combination color muting with selected phasings allows for the video pickup tubes or CCD pickup elements to show alternate and variously selected phases of depth of field focusing for three-dimensional imagery.

The following sub-atomic phasings are utilized to clock the high speed RGB switched phasings of the StarCam system as shown in FIGS. 8-1 to 8-3 section B, imputed at SA1 in FIGS. 8-1 to 8-3.

This is a holographic control pulse generating system for processing television signals form sub-atomic phasing in which a high definition dimensional effect can be observed in the displayed television signals, by providing photon phasings that are holographically orientated and sub-atomically controlled by electron mueon phasings which when merged with conventional television signals phase the normal television signals into a holographic display on the standard CRT, which produces a dimensional visual scene from a conventional or standard television camera, or video signal.

The displayed visual scene, when viewed on a standard television receiver, is perceived as a 3-dimensional image with an expanded depth of field viewed in a high definition format.

Phasings of the W and Z particles of the electro Weak Force as established by Cola Rubia and his colleagues at Cern in 1983 can be replicated electronically by certain holographic electronic phasing, which can be used to create high definition 3-D TV.

Electronic Sub-Atomic muting or Mueon electron Phasing is accomplished similarly to sustain the same sub-atomic Mueon electronic results as shown in the Cern Experiment by Cola Rubia and his colleagues which was set up to prove the existence of the W and Z phasing of the Electro Weak Force, i.e. sub-atomic proton and anti-proton particles were phased in opposite direction in the Cern Cyclotron and photographed at a collision point to show the existence of separate Mueon tracks phased differently proving the existence of the mueon electron particles W and Z. The W energetic particle providing a single straight track proving its existence, and the Z energetic particles providing two straight tracks of electron Mueons, to prove its existence.

The electronic television camera as we know today collects visual data (Photons) on to photo sensitive material (phosphorus) which is scanned horizontally synchronously line by line and reproduced to a television monitor (CRT), in which the series of line scans are reproduced faithfully to a CRT or phosphorous screen which lights up dot by dot, line by line. The phosphorous in the vacuum tube presents or replicates the visual scene focused on by the lenses of the electron TV camera.

In today's TV system a two-dimensional scan is shown or visualized to the flat TV surface or CRT. What is now shown and described is (instead of a two-dimensional flat image) an image produced to the CRT by a sub-atomically phased electronic pattern which produces the same image to the CRT but transformed into a sub-atomically phased holographic image. The CRT's phosphorous dot pattern is sub-atomically phased against each other and produces a third image or hologram which when viewed by the human visual system is visualized in the brain as a 3-dimensional holographic image, processed into a magnetic sub-atomic hologram, which is magnetically scanned from both left and right brains into a high definition visual image.

What is being shown and characterized is an electronic phasing circuit that emulates holographic phasings of sub-atomic structure that sustains electronic phasings of the W and Z Mueon energetic mueon electrons, allowing continual use and control of sub-atomic phasings, to encode holographically the electron Weak Force which in turn controls the Strong Electrical Magnetic Force, which in turn may be used to encode high definition dimensioned signals to a CRT.

Instead of using Mega Volt high cost cyclotrons to smash by brute force sub-atomic particles with billions of volts to produce sub-atomic mueon electron phasing that last only billionths of a second we electronically achieve holographically control of the phase of the sub-atomic weak force to in turn sustain indefinite control of the Electro-Magnetic Strong Force, and the Sub-Atomic Strong Force. (The electro Weak Force acting holographically as the control factor over the Electro-Magnetic Strong Force and other forces.)

Thus, we contend that such holographically phased Sub-Atomic patterns (W & Z) exist in matter, or nature (not just as results of a smashed atom or protons) but as holographic sub-atomic control phasings, which in turn determine the very structure of (atomic) matter existing as the DNA of matter, (MDNA) cracking the door to a new form of sub-atomic alchemistry.

Thus, a key to understanding ordinary matter is shown utilizing holographic electronic phasings to control the Electro Magnetic Force, Gravity, Strong Force, and the Electro Weak Force.

As any molecular structure or matter is spun horizontally, natural magnetic poles are created vertically at the center of the spin. (i.e. gravity)

The angle of the poles [Vp (x)4] determines phase angle of the spin in relation to other spinning bodies of matter (as in magnetic masses of photons) in proximity to each other. A spinning object spinning at specific rates different to an object in proximity would be out of phase with each other. (i.e., if they were spinning at the same rate (regardless of size or weight) they would be in phase with each other.)

Thus, strings of photons can attach to each other and produce the same color balances. Photons out of phase would produce other colors, etc. As an example: as in photon molecular structure, galaxies, indeed the whole universe, when spinning a center of gravity is created or installed. The nuclei of atoms, the center of the Sun, the center of galaxies, the universe, even photons spin. (i.e., left handed or right handed; ref: Scientific American "Photons have a right handed or left handed spin", and their poles would have a different angle, in relation to other bodies around them.)

The angle of the poles Vp (x)4 determines phase or angle of the spin in relation to the spinning bodies of matter in proximity with each other. Spinning objects spin at specific rates different to objects in proximity with each other would be out of phase. If they were spinning at the same rate and coming in from the same angle of sight (regardless of size or weight), they would be in phase with each other. Thus strings of photons, at a particular angle, can attach to each other and produce the same ratio of color balances per angle and distance. Photons out of phase, coming in from a different angle and/or distance, would produce slightly different hues and colors, producing dimensional phase angles. (i.e., dimensional weight.)

We can now postulate that all matter has a center of gravity as produced by its spin rate. (i.e., nuclei of every atom.) If they were spinning at the same rate (regardless of size or weight), they would be in phase with each other. Thus strings of photons attached to each other and producing the same color balances, would indicate origin of the same angle and distance. Photons out of phase would produce slightly different hues of color, indicating origin of a different angle and/or distance.

We can also postulate that any visual scene of matter has a center of gravity as produced by its phased spin rate of the combined holographically phased nuclei of all the atoms, thus giving the human brain critical information to decipher dimensional information regarding depth, angle, perspective, and even related hue color information. As an example, the so called "red shift" which scientists utilize to measure the distance to distant star systems, is a prime example of color frequency phase shifting information provided by incoming spinning photons to give super accuracy concerning distance and angle information, showing that photons can be affected by time and space gravity continuums.

Whether of photons or atoms, etc. rate of spin determines the force and phase of the mass of the object. (i.e., gravity intensity of the core or nuclei Sr $(x=\{G(x)2]$ when $G=[Sr (prp)2]$. Even photons have a g (x) 2 core, and resulting vertical poles.)

Simply by changing phasing of the sub-atomic photon particles holographically, to new phase counts, you can position an image holographically on the electronic CRT, producing dimensional weight.

Nature postulates that all matter has a center of gravity as produced by its spin rate, (i.e., nuclei of every atom and its associated group of control electrons.) By phase manipulation we can offset the center of gravity (dimensional weight) of a group of photons causing the replication of dimensionary information coming to the eyes and the brain. Via its method of scanning horizontally. The rods and cones of the human eyes, dimensional phase information is transmitted to the brain. Histeresis Sub-Atomic-Mueon holographic phasings replicate to the brain's sensors visual scenes dimensionality, via sub-atomic phased electron mueon brain holograms.

Holograms are known and visualized in nature, such as rainbows, layered frost on a window, or they can be produced with split laser beams of coherent light; or magnetically produced as in seismographic equipment, as described by Dan Silverman in his patents; or as in our description, they can be produced as sub-atomic patterns phased against each other, coherently, on a CRT or television monitor.

The di-fraction of light as provided by a triangular prism piece of glass to produce a rainbow spectrum pattern order of color is another prime evidence of the phasing of the spinning photons encoding color, as related to incoming angle, (dimensional weight) distance and spin phase of the incoming photons. As you go from one end of the spectrum of the rainbow color encoding, the lower frequency colors spin slower than the higher frequency brighter colors. Their spin phase rate (dimensional weight) is ordered exponentially according to their perspective color.

As in a prism, where colors separate out at different successive angles, closely phased strings of photons merge together because of their relative mass and spin rates. As they beat against each other, with constructive and destructive muting, holographic nodes appear. Finally as individual photons phase together they lock harmonically into successive different nodes of primary and secondary order, mimicking the (hex) hexagonal order and structure of photons. (i.e., three primary colors red, blue and green, and secondary phased color masses of magenta, cyan and yellow.)

Sub-atomic muezzin energetic electron phasing is the heart of this description or invention, and presents a new form of holography, indeed a new form of controlling and understanding the visual format of the human brain in visualizing dimension in nature.

By controlling the spin rate and phase rate [Sr(x)2, and Pr(x)4], and by controlling the spin rate and phase angle rate of change, in a four stage sequence:

$$\{[Sr(w) \text{ to the power of } 2]*[Pa(z) \text{ to the power of } 4]\}=+wP, \text{ and conversely,}$$

$$\{[Sr(z) \text{ to the power of } 2]/[Pa(w) \text{ to the power of } 4]\}=-zAP,$$

$$\{[Sr(z) \text{ to the power of } 2]*[Pa(w) \text{ to the power of } 4]\}=+zAP$$

$$\{[Pa(w) \text{ to the power of } 2]/[Sr(z) \text{ to the power of } 4]\}=-wP.$$

Then, if you postulate that:

$$[(+wP)+(-zAP)]=[(+zAP)+(-wP0\}$$

then: $+wP=[(+zAP)+(-wP)]/(-zAP)$

Therefore: if you change either spin rate or phase of any of the above components, you change the status quo or dynamic balance of the sub-atomic particles and take charge of the resultant +wP. (nuclear weight of the proton=dimensional weight of the photon).

Therefore: $\{[Sr(w) \text{ to the power of } 2]*[Pa(z) \text{ to the power of } 4]\}$=hDW (Holographic Dimensional Weight) or mass of sub-atomic particles the electron of atomic structure, i.e. visual data to the brain via the rods and cones of the scanning system of the human eyes, dimensionality, (phase rate or dimensional weight) can be controlled.

By holographing the phase structure of electrons, we then take control of the phase angle of sub-atomic particles. By resetting the spin rate and change of phase rate of sub-atomic particles, we then control dimensional weight, (i.e., we then can control dimensional imagery, produced as a sub-atomic electron hologram.)

What is shown is a mechanism that holographically phases sub-atomic particles to emulate and even replicate the true dimension of real life as interpreted by control structure of human eyesight, by a method and electronic apparatus mechanism that holographically phases the sub-atomic structure of atomic mass to change atomic structure or control of the holographic spin rate of photons which is interpreted by the human sight systems a replication of real life dimensional imagery.

By phased focusing of the beams of the electron guns of a CRT toward the object pixels, red, green and blue dots of the CRT, the energetic electron beams of the CRT being sub-atomically phased, you can then change the pixel dot sub-atomically phased into a bibble of the object imagery being illuminated, causing a real life like or dimensional system of imagery, or true life replication, by means of holographic electron imagery displayed on a television screen.

Whether of photons or atoms, etc., rate of spin determines the dimensional weight and phase of the mass of the object. i.e. gravity intensity of the core or nuclei $Sr(x)=[G(x)2]$ when $G=[Sr(prp)2]$. Even photons have mass and spin rates with an electron vacuum core with resulting vertical poles.

By changing the photon phasing, the resulting poles are realigned. With sub-atomic replication, or phasings, you can have a new kind of imagery. (i.e., Simply by changing a photon group bibble (bibble refers to group phasing of a cluster of photons which are organized into 6 different distinct phased phasings, organized similarly to bits, and bytes of a computer system. One pixel of a television screen is muted constructively and destructively by the hologram phasing into multiple distinctive phasings.)) Phased sub-atomic particles hologram a new holographic version of the old two-dimensional imagery which is replicated to the CRT as a visual hologram.

Holograms are known and visualized in nature, such as rainbows, layered frost on a window, or they can be produced with split laser beams of coherent light; or magnetically produced as seismographical equipment, or as in our description, they can be produced by sub-atomic patterns phased against each other to produce holographic visual scenes, coherently.

Sub-Atomic-Mueon phasing is the heart of this invention, and presents a new form of holography as related to visual replication, indeed a new form of controlling and manipulating visual imagery, electronically.

By holographing the phase structure of electrons, we then take control of the phase angle of sub-atomic photon particles. By resetting the spin rate and phase of sub-atomic particles, we then control the dimensionality phase.

By controlling the spin rate and phase rate, dimensional weight [Sr(x)2 Pr(x)4] of sub-atomic particles the electron mass of photons are restructured into a high density dimensional holographic visual scene displayed on a standard CRT.

Figure 11:
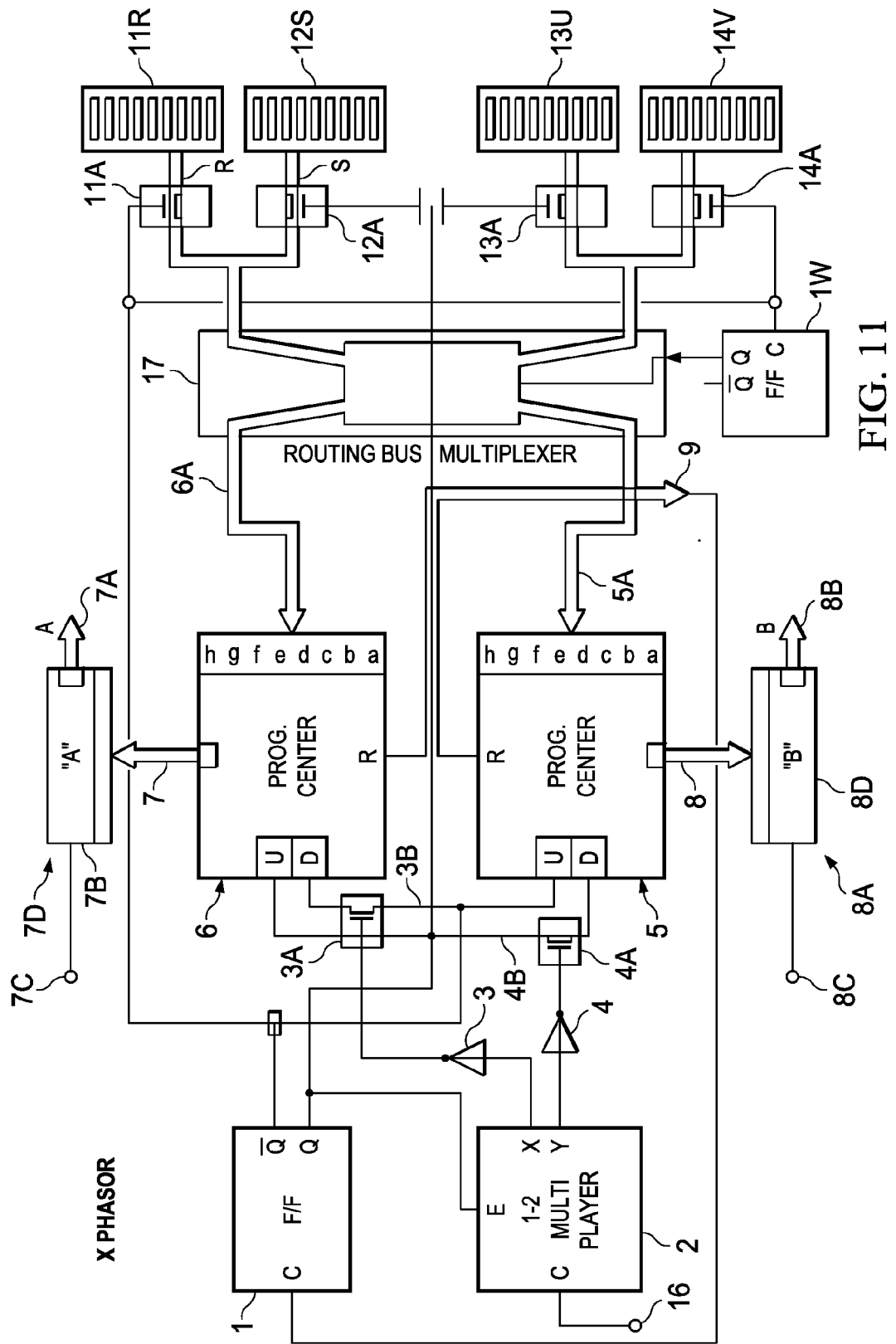
FIG. 11 is a pictorial representation of a control circuit in accordance with an illustrative embodiment.

In FIG. 11, is shown a high density dimensional regenerative sub-atomic mueon phaser control circuit. It is an improved method, to control the phasing of the PLLs of FIG. 12, with which to spin phase the muting sub-atomic mueon encoding of FIG. 13. It is so named because it spin phases the two main control pulses 7A and 8B conversely, and alternately phases them [(Z/K)*(n+y) to the exponential power xa] and [(Z/K)*(n−y) to the exponential power xa] degrees behind each other and spins them simultaneously in opposite rotation to each other in a phased configuration.

This is accomplished by the combination of two programmable up-down 0-3 counters 5 and 6. Four digital thumbwheel switches #11R, 12S, 13U and 14V, are arranged is such a manner that their presets alternately program successively the input jams of counters 5 and 6 to produce abcdefgh digital counts, which are fed to the to the program abcdefgh inputs of the 7D and 8D counters. These counters are clocked at 7C and 8C by external control signals which are fed back from down stream in the signal generating process, (the "A" 72 output of FIG. 12 tied to the "B" 8C input of this circuit and conversely, the "B" 73 output of FIG. 12 tied to the "A" 7C input of this circuit) giving crossover x-power exponential regenerative holographic variable control frequencies for the proper ultimate sub-atomic mueon muting for destructive and constructive holographic sub-atomic mueon phasing control injection signals.

The outputs of the digital thumbwheel switches #11R, 12S, 13U and 14V, are fed to the abcdefgh program inputs of counter #5 which programs it to a count always exactly [(Z/K)*(n+y) to the exponential power xa] and [(Z/K)*(n−y) to the exponential power xa] degrees out of phase with the other counter #6. (This causes the counters 5 and 6, to always count in opposite directions to each other in a precise four phased manner, by final means of the routing bus multiplexer 17, which alternately exchanges the control presets 13 and 14 with thumbwheel control presets 11R and 12S.)

The sub-atomic mueon phaser's program counters 5 and 6 are clocked at input #16.

The Vertical Drive Clock pulses #16 are routed via multiplexer 2 to either inverter #3 or #4 which alternately clock the up down gates for the up and down clocking of program counters #5 and #6, as determined by the said 1-2 multiplexer #2 which with the help of inverters 3 and 4, and analog switches 3A and 4B, changes the source of preset count of digital thumbwheel switches set #11R and 13U, or set 12S and 14V, as counters 5 and 6 reach 0, either up or down, from their respective n count. This causes the input presets of the counters #5 and #6 to reset up and down consecutively and always in opposite direction from each other, for phases 1 and 2, then exchange sets of presets between set 11R and 13U, or set 12S and 14V preset jam numbers.

Flip-flop #1 simultaneously changes the up/down phasing count of the output of counters #6 and #5, causing them to alternately lead or lag each other [(Z/K)*(n+y) to the power of xa]–[(W*K)/(n–y) to the power of xb] degrees out of phase with each other in a precise manner, by clocking the up/down inputs of the counters 5 and 6. Every time the counters complete an up/down or down/up cycle, their reset pulse clocks a shared "OR" gate 9, which clocks flip-flop 1 to change direction of the up/down busses 4B and 3B. The Q' outputs of flip-flop 1 clocks flip-flop 10 which exchanges the buss outputs of buss routing multiplexer 17. This gives the sub-atomic mueon phaser a four cycle phasing pattern. Digital outputs #7 and #8 presets the programmable counter 7D and 8D, whose "A" and "B" outputs preset in turn, the counters #10 and #9 of FIG. 12 of the dual holographic 4 phase spinning control digital encoding PLLs of FIG. 12; which clock phases and spins the sub-atomic mueon encoded "A" and "B" n1, n2, . . . n8 degree muting control signals of the final holographic muting encoding control signals of FIG. 13 which are injected into the television envelope (21-26 of FIG. 13) to produce the holographic visual scene as generated on a television screen or monitor, via in and out composite video connections 27 and 28 of FIG. 13.

Figure 12:
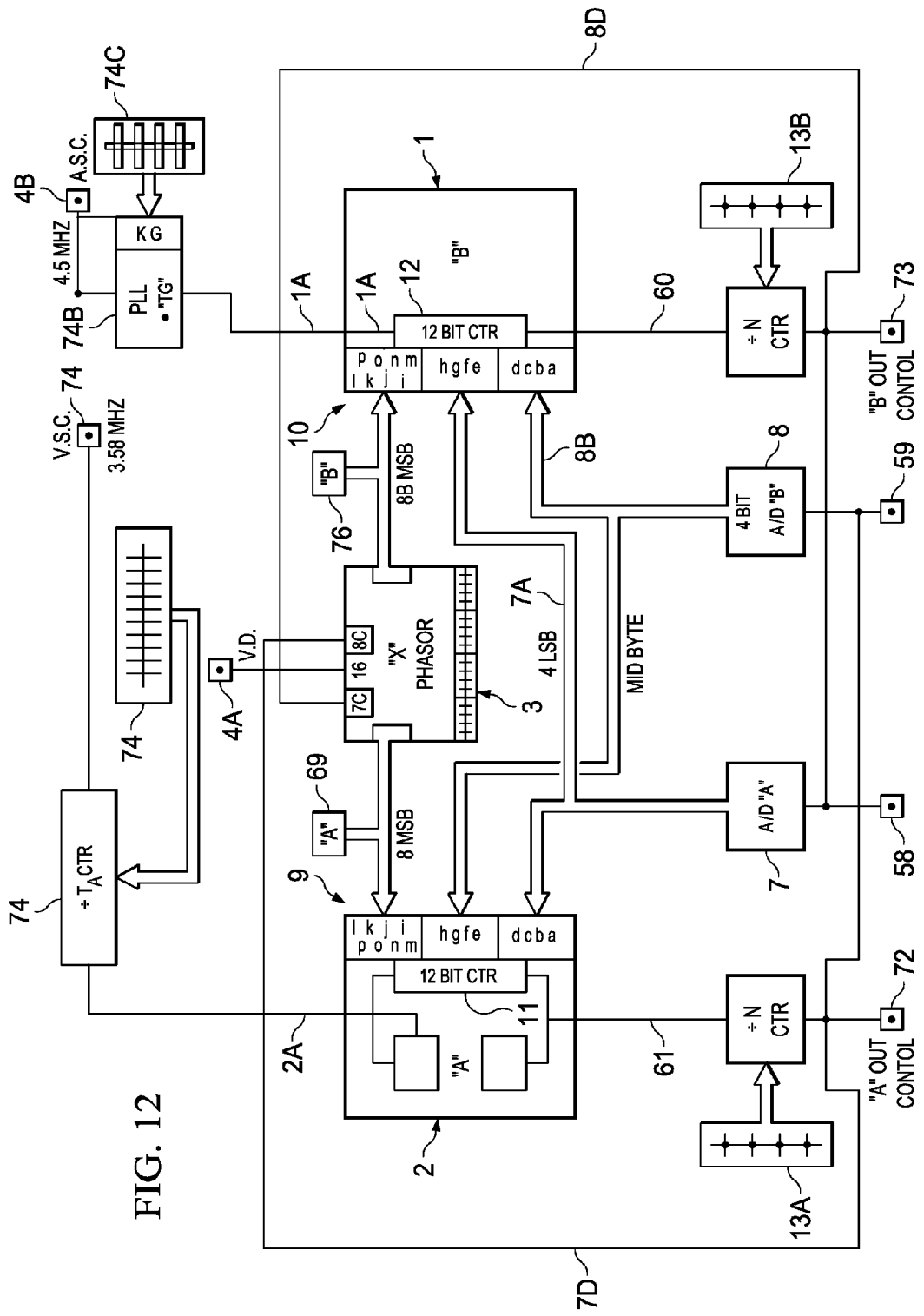
FIG. 12 is a pictorial representation of a circuit for controlling phasing in accordance with an illustrative embodiment.

In FIG. 12 where the "X" phaser (#3) and the "A" and "B" programmable phase lock loop #2 and master programmable divider #1 are shown, is the origin of the two, "X" two phased control signals, namely the "A"+/–signal Sub-Atomic-Mueon control phasing $$[(Z/k)*(n+y) \text{ to the exponential power } xa]$$

and $[(Z/k)*(n-y)$ to the exponential power $xa]$ developing alternate phased constructive exponentially curved force lines, and the +/–"B" control Signals $$[(W*k)/(n-y) \text{ to the exponential power of } xb]$$

and $[(W*k)/(n+y)$ to the exponential power of $xb]$ developing alternate phased destructive Sub-Atomic-Mueon straight line control Phasings. These two converse signals, "A" and "B", spinning in forward and reverse rotation, forming dual control, four phased signal pulses #61 and #60, are the building blocks of proton and anti-proton simulation of the W and Z energetic electron mueon control of the electro weak force which electronically encode the dual Sub-Atomic-Mueon strong force phased control system signals, which in turn control the electrons of the electro-magnetic strong force.

Looking again now at FIG. 12, the television subcarrier sync signal (#4) is divided by "k" (the proton nucleus atomic weight multiplier, set at 90 to match the Cern experiment, set by thumbwheel switch 74D) via n counter #74 and fed to via input #2A to master X PLL, to develop the constructive "A" holographic signals. The 4.5 MHz audio carrier signal inputted at (#4B) is routed to pre-scalar multiplier PLL (#74B) whose output "K" factor is set at 80, by thumbwheel digital switch 74C, to match the Cern anti-proton weight factor, and inputted to master divider "B" to develop the alternate respective destructive control frequencies. The television system vertical drive sync pulse, (4A) clocks the "X" Phaser, via its input #16.

The most (#9 and #10) significant bits (m–1) of the programmable preset inputs of the divider counter of PLL loop #11 and master divider counter #12 of programmable phase lock loop "A" and master divider "B" #1 and #2 are programmed or switched by the "X" phaser A and B outputs (#7A and #8B of FIG. 12).

Figure 13:
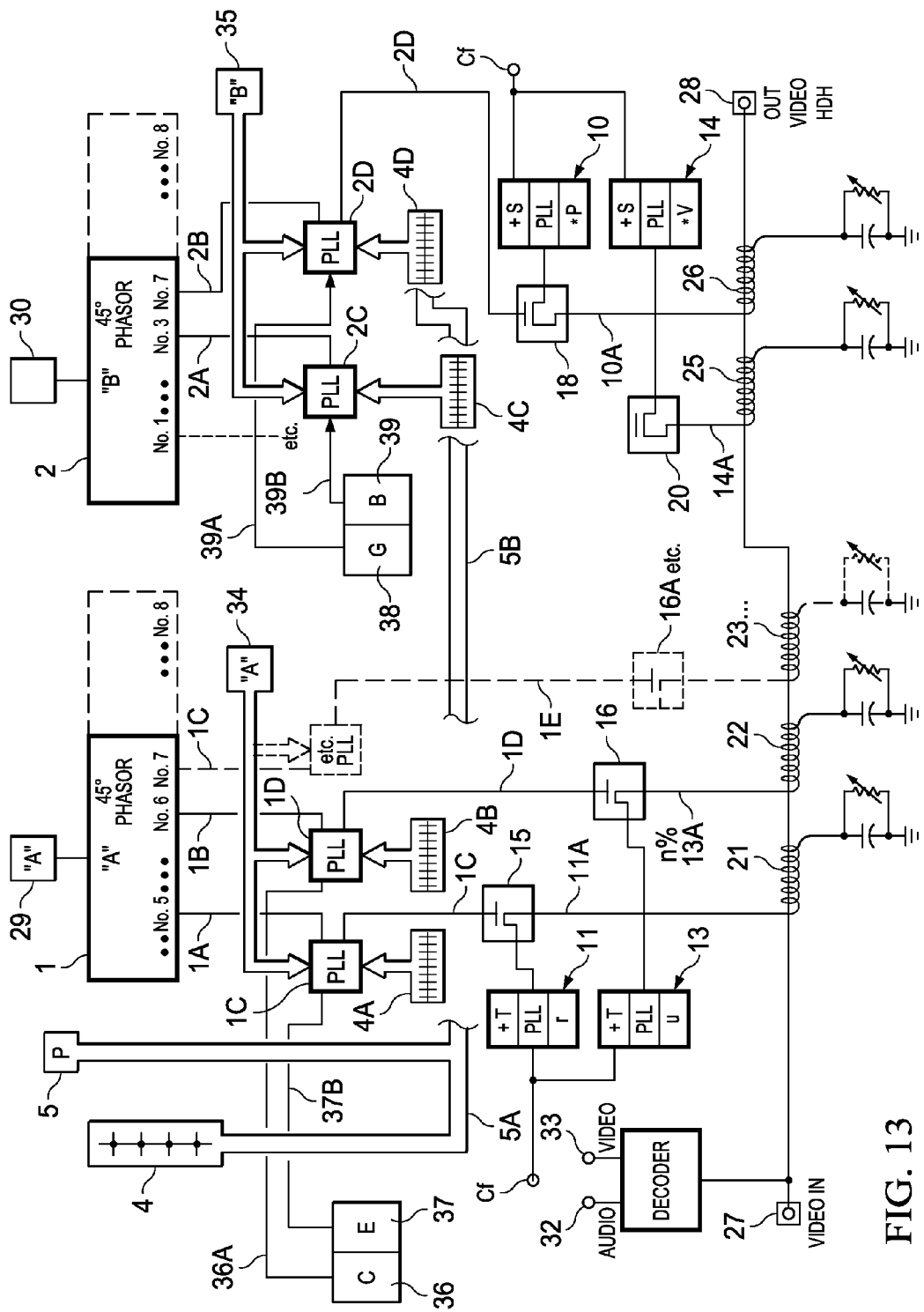
FIG. 13 is a pictorial representation of a circuit for holographic processing in accordance with an illustrative embodiment.

Thumbwheel switch #13A and 13B post scales the final range and reciprocal feedback ratio of the output of the master phase lock loop and master divider, to the nominal one to six megahertz range of the final outputs of FIG. 13 for the NTSC television band width range. (This range set with regard to the final output ranges of desirable compatibility of the system being processed; namely NTSC, PAL, SECAM or High Definition applications, of which the latter may go up to ranges including 20 to 30 MHz.)

Analog to digital converter #7 of FIG. 12 converts the fundamental system control signal #58, to the abcd (first four) significant bits of the PLLs "A" divider feedback loop #11 (16 bit configuration).

Analog to digital converter #8 of FIG. 12 converts the fundamental system control signal #59, to the abcd (first four) significant bits of the PLL's "B" master divider counter #12 (16 bit configuration).

In accordance with the inventors' discovery that the brain sees and hears holographically on a relative reciprocal basis, D/A converters #7 and #8 are cross encoded by inserting the same abcd preset control busses to the next four significant bits of the "A" and "B" master phase lock loop and master divider's opposite side (i.e., the "A" or #7 A/D output is also routed to the "B" efgh section of the presets of the master divider "B".) Conversely the "B" or #8 A/D output is also routed to the "A" efgh section of the presets of the master phase lock loop divider "A" of the audio and video signals respectively at #58 and #59, to complete a multiple reactive feedback path to encode the brain holographically by the alternate cross feedback perception paths (7A and 8B). The final "A" and "B" control pulses are exited at outputs #72 and #73. The control signals to the Sub-Atomic-Mueon switching section of the circuit are outputted in four distinct phases and configurations:

Phase 1:

"A" is rotating clockwise ascending (from count presets 11R and 13U of FIG. 11) varying by Sub-Atomic-Mueon constructive and destructive feedback means of the A/D converters #7 and 8 of FIG. 2) and destructive exponential feedback signal 8D.

"B" is rotating counterclockwise descending (from count presets 12S and 14V of FIG. 11) the said count varying by Sub-Atomic-Mueon destructive and constructive feedback means of the A/D converters #7 and #8 of FIG. 12 and constructive exponential feedback signal 7D.

"A" leads "B" by $\{[(Z/k)*(n+y)$ to the power of $xa]-[(W*k)/(n-y)$ to the power of $xb]$ degrees. [Where z is the frequency of the system sub-carrier (4 of FIG. 12), where W is the frequency of the system audio carrier (4B of FIG. 12), k is the prescalar divider (74 of FIG. 12 and n=the preset inputs (11R and 13U of FIG. 1) and y is defined as the clock input pulses (16 of FIG. 11), and xa and xb being defined by the above said feedback means (#7D and #8D of FIG. 12)]

Phase 2:

"B" is rotating clockwise ascending (from count presets 11R and 13U of FIG. 11) varying by Sub-Atomic-Mueon constructive and destructive feedback means of the A/D converters #7 and 8 of FIG. 12 and constructive exponential feedback signal 7D.

"A" is rotating counter clockwise descending (from count presets 12S and 14V of FIG. 11) varying by Sub-Atomic-Mueon destructive and constructive feedback means of the A/D converters #7 and #8 of FIG. 2 and destructive exponential feedback signal 8D.

"B" leads "A" by $\{[(W/k)*(n-y)$ to the power of xa]$-[(Z*k)/(n+y)$ to the power of xb] degrees. [Where z is the frequency of the system sub-carrier (4 of FIG. 12), where W is the frequency of the system audio carrier (4B of FIG. 12), k is the prescalar divider (74 of FIG. 12) and n=the preset inputs (1 IR and 13U of FIG. 11) and y is defined as the clock input pulses (16 of FIG. 11), and xa and xb being defined by the above said feedback means (#7D and #8D of FIG. 12)]

Phase 3:

"A" is rotating clockwise ascending (from count presets 12S and 14V of FIG. 11 varying by Sub-Atomic-Mueon constructive and destructive feedback means of the A/D converters #7 and 8 of FIG. 12) and destructive exponential feedback signal 8D.

"B" is rotating counter clockwise descending (from count presets 12S and 14V of FIG. 11) varying by Sub-Atomic-Mueon destructive and constructive feedback means of the A/D converters #7 and #8 of FIG. 12 and constructive exponential feedback signal 7D.

"A" leads "B" by $[[(W/k)*(n+y)$ to the power of xa]$-[(Z*k)/(n-y)$ to the power of xb]\}$ degrees. [Where z is the frequency of the system sub-carrier (4 of FIG. 12), where W is the frequency of the system audio carrier (4B of FIG. 12), k is the prescalar divider (74 of FIG. 12) and n=the preset inputs (12S and 14V of FIG. 11) and y is defined as the clock input pulses (16 of FIG. 11), and xa and xb being defined by the above said feedback means (#7D and #8D of FIG. 12)]

Phase 4:

"B" is rotating clockwise ascending (from count presets 12S and 14V of FIG. 1) varying by Sub-Atomic-Mueon constructive and destructive feedback means of the A/D converters #7 and #8 of FIG. 12 and constructive exponential feedback signal 7D.

"A" is rotating counter clockwise descending (from count presets 11R and 13U of FIG. 11) varying by Sub-Atomic-Mueon destructive and constructive feedback means of the A/D converters #7 and #8 of FIG. 12 and destructive exponential feedback signal 8D.

"B" leads "A" by $\{[(W/k)*(n-y)$ to the power of xa]$-[(Z*k)/(n+y)$ to the power of xb] degrees. [Where Za is the frequency of the system sub-carrier (4 of FIG. 12), where Zb is the frequency of the system audio carrier (4B of FIG. 12), k is the prescalar divider (74 of FIG. 12) and n=the preset inputs (12S and 14V of FIG. 1) and y is defined as the clock input pulses (16 of FIG. 11), and xa and xb being defined by the above said feedback means (#7D and #8D of FIG. 12)]

In FIG. 13 is shown the final implementation of the Sub-Atomic-Mueon encoded muting holographic process. It is dependent upon the "A" and "B" "X" phaser control pulses from #72 and #73 of FIG. 3.

In FIG. 13: Two 45 degree generators n1 and n2 ... to n8 degrees, (1 and 2) n1 being 45 degrees, n2 being 90 degrees, n3 being 135 degrees, etc. These said phase generators being clocked respectively by the "A" and "B" Sub-Atomic-Mueon control signals generated by circuitry of FIG. 12 outputted at 72 and 73 of FIG. 12.

Sub-Atomic-Mueon muting (via analog switches 15, 16, 18 and 20) of the injected sideband control sub-subcarriers (10 and 14) and (11 and 13) are dual phase encoded directly with Sub-Atomic-Mueon phasing (buss "A" and "B" X phased 34 and 35) via intermediary PLLs (1C, 1D, 2C and 2D) specially referenced exponentially, by the means of special musical note control (via special audio generators 36, 37, 38 and 39) frequencies, whose harmonic relation to each other produces the spatial holographic nodel muting, (via analog switches 15, 16, 18 and 20) that when injected (via inductance capacitance means 21, 22, 25 and 26) into the final NTSC or PAL, or SECAM television signal envelope, dimensionalizes the final video and audio imagery (via input 27 and output 28). The melodic scale is Sub-Atomic-Mueon aligned with the universal melody of matter. (i.e., the melodic scale which has experimentally fallen in line with great musical compositions of the ages is merely a reflection of the harmony of the universe, which gives us phasing alignment for the Sub-Atomic-Mueon hologram that matches biological systems of human visual sight and hearing.)

Four analog switches mute the four above described control frequencies according to control pulses generated by the "two" "A" and "B" clocking counters (#1 and #2 of FIG. 13) producing Sub-Atomic-Mueon phased overlapping selected phase n1, n2 ... n8, (only two of the eight 45 degree phases are utilized in this description, additional stages may be cascaded as shown by dotted lines 1C, 1E, 16a and 23) 45 degree pulses whose outputs are exponentially expanded by programmable Phase Lock Loops 1C, 1D, 2C and 2D. (Similar to the #1 PLL of FIG. 12, only with 8 bit feedback dividers instead of 16 bit dividers.) The 1st four significant bits of the internal programmable feedback loop dividers of these PLL and master divider are buss controlled manually by digital thumbwheel switches #4A, 4B, 4C and 4D. (These individual controllers position individually the phase position of the below described sideband control sub-subcarrier signals, for various applications and can be put under external control manually or by computer. These thumbwheel external controllers can also be buss connected by thumbwheel switch 4, via buss connectors 5A, 5B and 5C.) The least significant bits of the "A" side PLLs 1C, 1D are under control of the digital four bit output A of the "X" phasor (#7A of FIG. 11). The least significant bits of the "B" side PLLs 2C, 2D, are under control of the digital most significant four bit output B of the "X" Phasor (37 of FIG. 11). The buss thumbwheel switches (4) control the most significant four input jams of the counters of PLLs 1C, 1D, 2C and 2D. These PLLs control the dimensional positioning of the imagery. (The buss control can be connected at plug #5 to Cad Cam computers or video game controls for dimensional positioning under external computer control.) The outputs of the above PLLs clock the gates of the analog switches (15, 16, 18 and 20).

Still looking at FIG. 13, the Sub-Atomic-Mueon signal phase encoders "A" (#1) and "B" (#2) mute the two sets of sideband control sub-subcarrier frequency clocks. These clocks re derived by phase lock loop clock generators 11, 13, 10 and 14. These Sideband Control Sub-subcarriers are generated by formulas Cf*(T/Np,q,r,u,v or w) and Cf*(S/Np,q,r,u,v or w) where T or S is designated the prescalar for the said PLLs, C frequency (in this case v.s.c. the television system sub-carrier 3.58 MHz sync signal is inputted at 4 of FIG. 12, and a.s.c. 4.5 MHz is inputted at 4B of FIG. 12), and N is the division number of the divider feedback of the phase lock loop feedback system and N is a whole integer where S=80 or T=90. ((i.e., if t is designated 90 then, p=86, q=87, r=88, s=89, t=90, u=91, v=92, w=93, and if S is designated to be 80 then, p=77, q=78, r=79, s=80, t=81, u=82, v=83, w=84.) The scope of this invention is not limited to the selection or example of the #90 as in this description to the 45 degree phasing exampled here with 8 whole integers. ((i.e., t or s could be "26" instead of 90 with 60 degree phasing utilizing 6 whole number integers, or any convenient system of degree phasing and resulting group of whole # integers.) However the formula is valid as long as the phasing is correlated to 90 times the nuclear weight of the proton and the opposite phase is correlated to 80 times the atomic weight of the anti-proton as in the W and Z discovery by the Cern experiment referenced earlier.

The inventors have devised the following Sub-Atomic-Mueon proton nucleus atomic weight master ratio control, consecutive integer factor chart:

| Proton Constructive Interference | | | | | "A" side | | | PLL | |
|---|---|---|---|---|---|---|---|---|---|
| 86 | 87 | 88 | 89 | 90 | 91 | 92 | 93 | exponential curved line |
| P | Q | R | S | T | U | V | W | intervals |
| | | 2nd | | 1st | | | | |
| | | 3rd | | | | 4th | | intervals |
| P | Q | R | S | T | U | V | W | straight line |
| 77 | 78 | 79 | 80 | 81 | 82 | 84 | 85 | straight line |
| Destructive Interference Anti-Proton | | | | | "B" side | | | Divider Counter | |
| | | | 4th | | 3rd | 2nd | 1st | intervals | |
| | 1 | 2 | 3 | 4 | 1 | 2 | 3 | 1 | 2 | * | * | * |
| c | c# | d | d# | e | f | f# | g | g# | a | a# | b | c |
| * | * | * | * | * | * | * | * | * | 2 | 1 | 1 |
| | | | | | | | | | 2nd | | 1st |

The #11 sideband control sub-subcarrier frequency is formula generated by a phase lock loop which is prescaled by dividing the television system subcarrier sync Cf (4 of FIG. 12) by T (90 in this case, in reference to the Cern experiments) and referenced to the said PLL, which in turn multiplies the said reference input by its divide feedback loop whose counter is set at two integer numbers below "T", which is "Nr" or 88 in this case.

The #13 sideband control sub-subcarrier frequency is formula generated by a phase lock loop which is prescaled by dividing the master system control television system subcarrier sync frequency s.c. sync (4 of FIG. 12) by T, (90 in this case) and referenced to the said PLL, which in turn multiplies the said reference input by its divide feedback loop whose counter is set at the next integer number above T, "Nu" (91 in this case).

The #10 sideband sub-subcarrier frequency is formula generated by a phase lock loop which is prescaled by dividing the television audio carrier frequency, 4.5 MHz, (4B of FIG. 12) by S, (80 in this case) and referenced to the said master divider counter (12 of FIG. 12), which in turn divides the said reference input by "Nw" (84 in this case).

The #14 sideband control sub-subcarrier frequency is formula generated by a phase lock loop which is prescaled by dividing the television audio carrier frequency, 4.5 MHz Cf (4B of FIG. 12) by 1 (80 in this case) and referenced to the said PLL, which in turn multiplies the said reference input by its divide feedback loop whose counter is set at "Np" (77 in this case).

In the NTSC version, the dual "video" sideband control sub-subcarrier clocks scCf*(T/Nr) and scCf*(T/Nu) #11 and #13 are analog switch muted by analog switches #15 and #16. The "audio" dual sideband control sub-subcarriers Cf*(T/Nr) and Cf*(T/Nu) clocks #10 and #14 are analog switch muted by analog switches #18 and #20 respectively.

These holographically muted or switching sideband control sub-subcarrier pulses are then injected into the NTSC, PAL or SECAM envelope by capacitance inductance coils, (#21, 22 25 and 26) which are capacitance resistance tunable for proper inductance.

The composite video signal is inputted at input #27 and exited at output #28, as a fully dimensionalized holographic signal which will play out on any standard NTSC, PAL or SECAM receiver. The original composite video signals must be processed by subcarriers matching the particular system NTSC, PAL or SECAM; the sub-subcarrier clock frequencies of this embodiment were selected for NTSC, however, the scope of this invention is not to be limited to any one particular system of television broadcasting format, only the controlling subcarriers of the particular system utilized, conformed to the particular subcarrier systems utilized by the system. The result is a fully dimensional high definition image signal generated holographically on a standard television receiver or monitor which can be recorded, or broadcast by standard means to satellite or cable systems for viewing a three dimensional holographic image on standard television receivers, monitors, or any CRT viewing system or computer CAD CAM systems, CAT SCAN systems or electron microscopic or telescopic systems.

FIG. 8 Section B

Looking now at the high speed muting section in FIGS. 8-1 to 8-3 (Section B), is seen the dual set of RGB color video amplifiers VL1 and VL2 which bring the two sets of red, green and blue video signals, from the left and right CCD color pickups CD1 and CD2 of Axes A2 and A3, up to proper switching and processing voltages. As primary and secondary light beams stream in through angled pinioned P1 and P4 lenses L1 and L4, combining with light from axes A2 and A3 to the left and right CCD RGB pickups CD1 and CD2, they are switched at the slow speed of Vertical Drive V3 switching pulses of the primary and secondary flip flops FF1 and FF2, however the high speed holographic muting section of FIGS. 8-1 to 8-3 section B is driven by imported high speed Sub-Atomic Phasings of FIG. 12 at inputs SA1 and SA2 respectively, from the "A" and "B" (72 and 73 of FIG. 12) X Phaser holographic control outputs. The said CCD color pickups CD1 and CD2 are synchronized by camera control sync buss CC3 which delivers normal television sync signals Vertical Drive, Horizontal Drive, and Subcarrier raster control signals. Vertical Drive (60 Hz in the case of NTSC, 50 Hz in the case of PAL and SECAM world wide systems) is clocked via lead V3 to clock flip flops FF1, FF2 and FF5. Flip flops FF3 and FF4 are clocked by the respective Q' and Q outputs of frame control flip flop FF5. This allows both sub-rasters of both RGB amplifiers VL1 and VL2 to transmit in a four phase, four field frame. Primary color video delays D1 and D2 are manually set by pot controls DS1 and DS2 for Pseudo 3-D dimensionalization when the StarCam lens system is bypassed and conventional pre-filmed video is reprocessed for Pseudo dimensionality.

Digital AND GATES A1, A2, A3 and A4 are utilized to pulse under phased control of the four phase raster control flip flops FF# and FF4, the high speed holovidic control muting signals SA1 and SA2 imported from the external programmable phase lock loop holographic "X" Phased generator of FIG. 12. The high speed muting output control pulses of the four said AND gates A1, A2, A3 and A4 pass alternately in a four phased pattern, of llinticular secondary and primary holographically invisible interference patterns which are generated by combining the outputs of RGB busses LB3 and LB4 to produce on the face of the television receiver, a holographic dimensional imagery of visual scenes when viewed on a conventional TV receiver, without the aid of coded viewing glasses.

Figure 10:
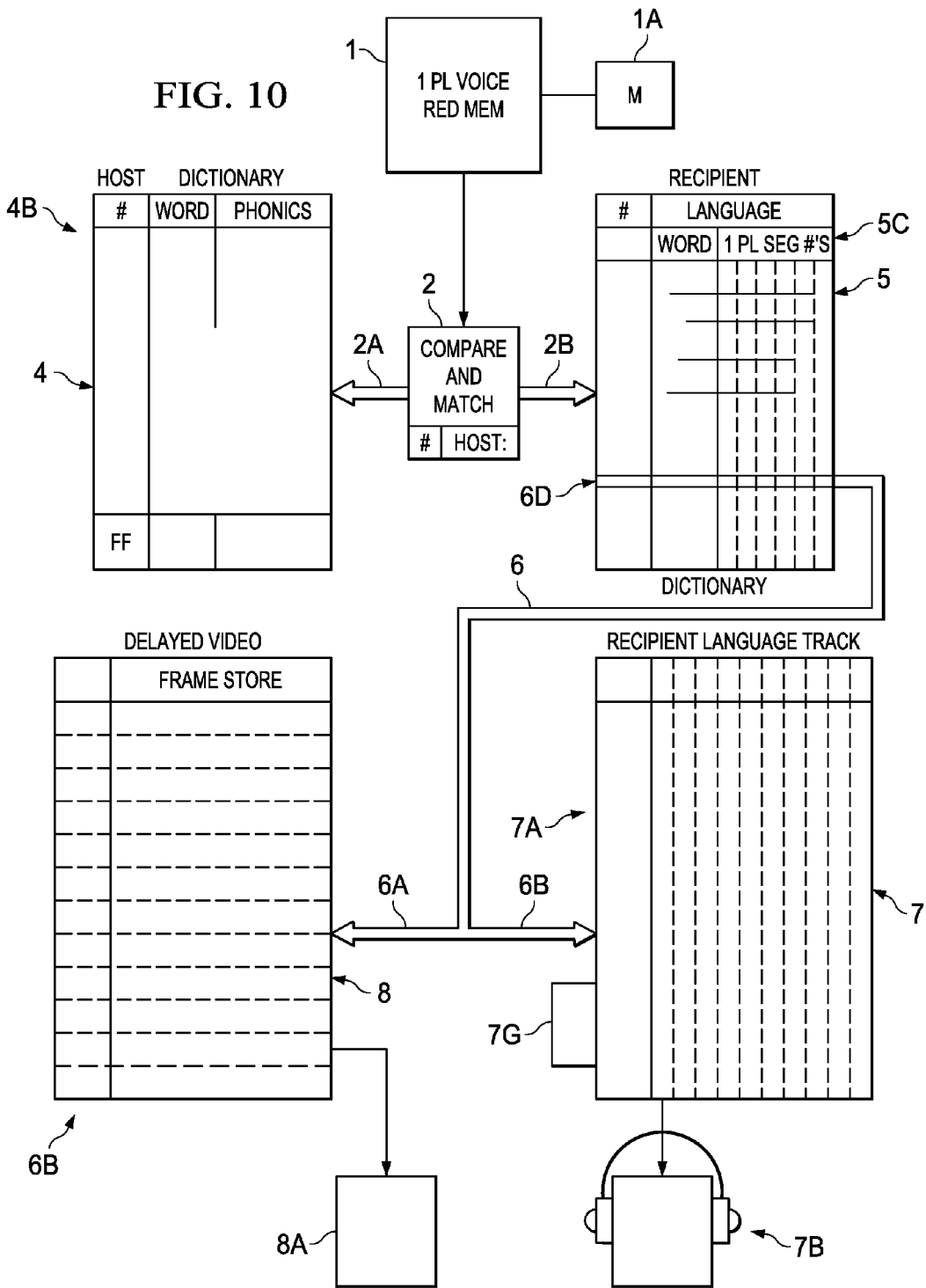
FIG. 10 is a representation of a holographic application for performing translations in accordance with an illustrative embodiment.

Automatic Holographic Language Track Translation Method for Television, Film, Audio and Print Looking now at FIG. 10: This invention also concerns the holographic application of multiple language real time automatic selective language track translations for film, television and written applications.

The holographic application concerns the real time identification of a host language 4, syllable by syllable phonics recognition 1 at ultra variable nx high speed applications of preestablished voice sound recognition patterns which are identified and returned in translated segments in phased and synchronized time delayed numbered segments, which encode the new assembled language to the host track 4. The synchronized and processed numbered encoding segments can then in real phased time, by made selective to the recipient chosen language track 5.

The following conventions will be utilized:

1. A numbered IPL phonic sound encoded recognition voice pattern memory bank 1, will be created by digitally recording the IPL (an international phonic language sound bank) phonic voice sounds in high medium and low male and female versions.

2. The host language dictionary 4, word by word will be encoded into memory with the identified numbered IPL phonic designations 4A.

3. The video and audio tracks will be selectively delayed 1 to 3 seconds synchronously by a running digitally synchronized 1 to 3 second time delayed moving frame store.

4. The voice audio track will be routed to the holographically alternately variable sweeping high speed IPL phonics analyzer comparison 2, encoding processors, which after the second verification, will compare to ensure accuracy and then will encode to the synchronized time encoded host sound track, a series of IPL encoded code number, 4A of the identified IPL voice segments.

5. The host language track memory at appropriate synchronized locations 4A, will receive the designated IPL numbered segments.

6. Each IPL syllable will be stored into the host track memory with a time position stamp 4B, (hour, minute, second and 1/100th of a second which will become its position locator in the host track memory. These syllables will be stored in word groups. The time stamp stack may overlap some syllables (in which case the volume of these overlaid syllables will be faded under the beginning of the next syllable). The word groups (in IPL designated hex numbers) will then be compared with the host word dictionary memory to retrieve and identify a recognized word 2A. The host dictionary will contain numbered words which will match numerically to the recipient dictionary 4A to 4B. Each numbered word, with its a, b, c, d, e, f, and g (in order of most frequent or popular use) thesauruses complements, in both dictionaries will also contain the IPL syllable designators. The IPL word bytes containing the assigned IPL numbers of the host track will be compared with the host dictionary IPL sequence codes to be identified and then assigned to the appropriate time stamp location 7A of the recipient language track.

7. A recipient IPL language bank 5, will house numbered digitally recorded IPL audio segments 5C, in Lo, Med, and Hi voice samples both male and female. A, B, and C will be male designators. D, E, and F will be male designators for the Lo, Med, and Hi audio digital samples. Each voice sample will also have a 1-7 volume level indicator number. Each voice sample will have a 12 note half step octave voice range frequency indicator, an expanded 3 octave sampling will allow for singing translations, in addition to the male, female Lo, Med and Hi range indicators. Additionally each voice sample will contain a voicing select indicator. A voice picture sampling will capture timbre voicing selection to duplicate voice recognition characteristics to imitate recognition contours of each new voice as introduced into the film or audio recording.

Individual voice recognition of the original host voice will automatically be analyzed and imitated by the IPL sound byte sample memory track as they are played back 7B, by the recipient track 7. The master IPL sound samples 5C, will be altered by envelope contouring (frequency, duration, sound level and timbre) to match the original host sound sample as the new translation is matched up by the recipient synchronized voice sync sound track.

Once the host track has been processed and the IPL segments analyzed, grouped into word bytes, identified by the host IPL dictionary, and assigned a dictionary word number along with its appropriate voicing select indicators, it becomes a master host track that can then be either played back in real time as the processing occurs or be retained in memory as a master track to be played out against any recipient language track chosen for any selected language.

Each recipient language dictionary (French, German, Italian, . . . etc.) will have its words assigned the same identifier numbers with corresponding words of the host dictionary, with each word of the same meaning and grammatical designation (i.e., verb, gender, noun, adverb, location, data\HLANGTK7 . . . etc.) having the same identifying number, and a word byte of appropriate IPL numbers to facilitate automatic replication of the time recipient track language word to be reproduced by the recipient track 7.

In the case of television replication by satellite, terrestrial cable, DBS or cassette tape, an early line scan can be assigned to recite and contain the IPL word byte with its accompanying voicing indicators, as positioned by the time stamp locator. Then language can be selected by an on site (black box on the television receiver) and the selected languages be played out automatically as the signal is received. The black box would have in its internal memory the appropriate mechanism to play out the IPL code with its accompanying voicing indicators as the instructions are deciphered by the black box. The black box would be loaded by a plug in carriage 7B containing the desired recipient language, with each word responding to the international language word number code, and grammarians arranger, and automatically assigning the correct IPL phonics to be played out as word bytes in the new recipient language. The black box could be loaded with several language dictionaries to offer a selection of languages at the flip of a dial.

In the production of material or programming to be utilized with the automatic language track system or device, the voice track preferably should be recorded on a separate track from all other sound effect tracks. The black box will then mix in the new language to the sound effects track. This procedure is inherently a cleaner reproduction of the translated track.

Otherwise an alternate method of mixing will be assigned as follows:

1. The audio range of voicing will be filtered out to the recognition holographic circuits 2.

2. In the recipient language track reproduction either in real time or auto language tracking reproduction the original voices (as Karaoke sing along methods) will be suppressed by appropriate audio filtering.

3. The recipient IPL language will be mixed over the original filtered sound tracks sufficiently loud enough to be heard and enjoyed by the listener 7B.

The IPL designation word byte 5D, along with its voicing indicators will also contain a holographic stereo sound positioning code for original room positioning of the played back voice track sound. (This code will indicate appropriate holographic information to position the sound as it was originally recorded.)

Also, as an additional embodiment of this invention, the print mythology or embodiment of this invention will embrace the following variations of this invention:

1. After the IPL holographic scanning of the voice track or recording of voice reading, and the IPL word bytes have been assigned to the host track, (or for that matter, from any processed track of this methodology) the international host dictionary numbers will be assigned to a word processing procedures connected to a computer word processor 8A for typing in either host language or taken a step further and processed after the selected recipient language numbers 8B have been assigned for automatic foreign language translation for printing only. This process may be used for automatic typing of voice dictation into any language either one at a time as selected or into multiple languages simultaneously, with multiple word processing computers systems connected to separate black boxes assigned to its selected recipient language.

In the case of multiple language audiences, black boxes may be multiplexed for any number of languages for selected separate language routing to appropriate earphones in the auditorium.

In the case of satellite transmission or tape distribution, black boxes can be utilized with plug in cartridges for the specific languages.

In the case of translations directly from a computer's word processor, the computers may be connected to the black box to directly translate from the word processor skipping the high speed holographic analyzing process and going directly to the IPL comparison state to translate the text.

Also included within the scope of this invention, is a high speed means of transmission of the holographic data utilized by this technology.

Figure 14B:
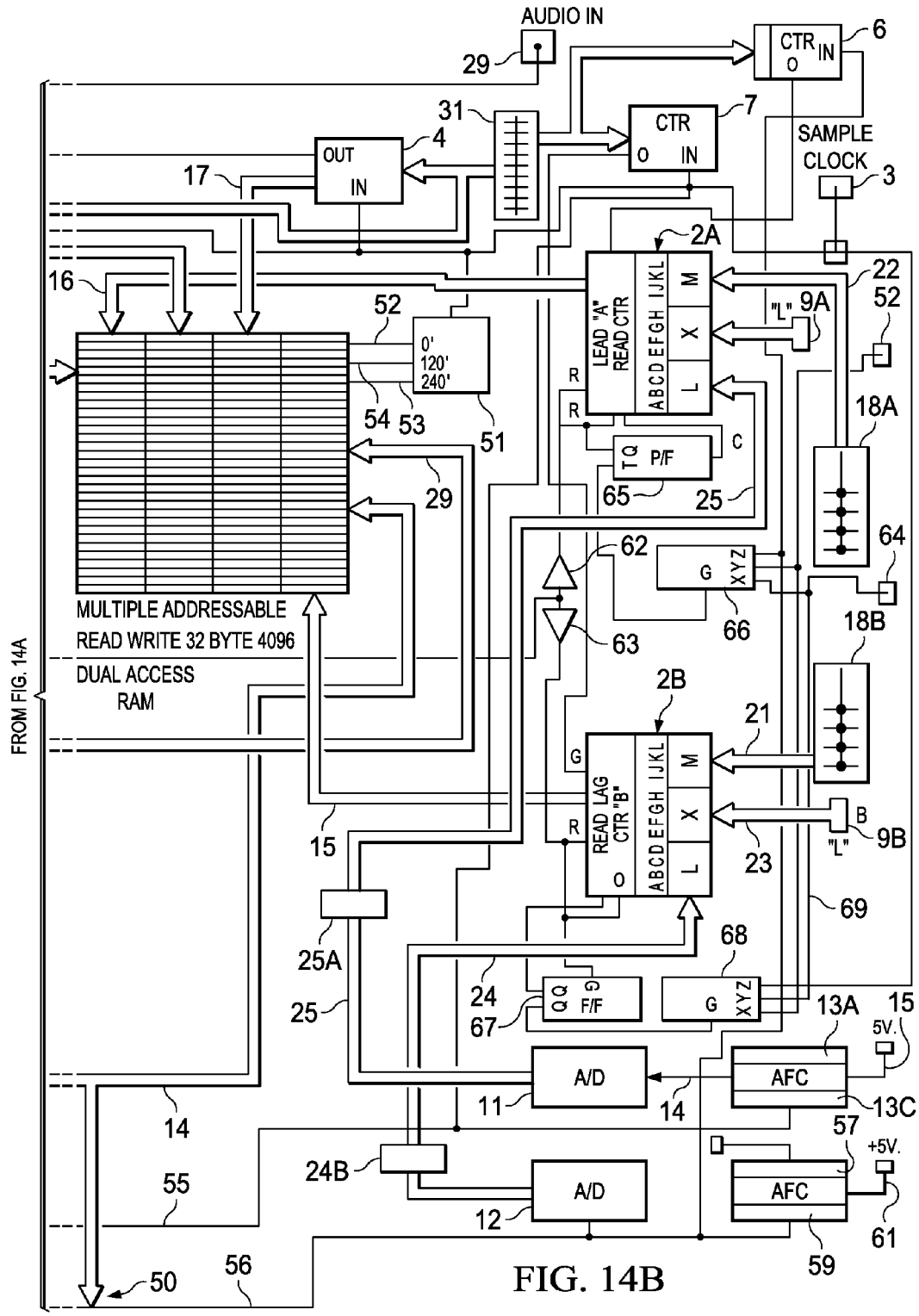

In FIGS. 14A and 14B is described a reactively programmable digital delay which also injects a programmable dual echo feedback loop which totally eliminates all microphone feedback and has multiple addressable dual access reader capability, which can exit a mono or stereo holographic dual output generated from one audio component.

The delay utilizes a 32 byte (bit byte 4096 register ram #1 which is continually written into by the output of a 12 bit analog to digital converter #8 which accepts the audio input #29 after it has been buffered by variable (volume) buffer #36. The said A/D output writes into the ram #1 by direction of write address counter #45, via buss #46. The write address counter #45 is clocked by sample clock input #29. (This sample clock is twice the frequency of the band pass width of the audio component being delayed; however this clock is divided by the number of bytes selected to be utilized as programmed by thumbwheel digital switch #31, to give more time for the appropriate number of bytes to be additionally entered into the particular register which the counter pointer digital buss #46 is indicating.) In each of the 4096 registers of the ram #1 one to thirty two bytes are written in as programmed by register size counter #4 which is controlled by digital thumbwheel register size switch #31, (this multiplies the capacity of the ram #1 to adjust for the frequency limits of the bandpass being processed; Hi frequencies take more memory space in the ram 0). Before the next register is accessed by the write address counter #45.

For Lo Band Pass applications the master sampling frequency is 600 cps. The Dual Access Delay will produce a 1.666 milli-second delay for each increment or register number set by thumbwheel switch # was set at 2 bytes per register.

For Mid Band Pass applications the master sampling frequency is 6000 cps. The Dual Access Delay will produce a 0.1666 milli-second delay for each increment or register number set by thumbwheel switch #18A or 18B. A setting of 1000 would produce a 1.333 second delay if the register size thumbwheel switch #31 was set at 8 bytes per register.

For Hi Band Pass application the master sampling frequency is 60000 cps. The Dual Access Delay will produce a 0.01666 milli-second delay for each increment or register number set by thumbwheel switch #18A or 18B. A setting of 1000 would produce a 0.466 second delay if the register size thumbwheel switch #31 were set at 28 bytes per register.

The delay has three sampling speed clock; the main reference clock is imputed at #3 and clocks the master analog to digital converter #8; the other two secondary sampling clocks are plus and minus 1% of the speed of the master sampling clock input #3. This makes the delay more dimensional and stops feedback distortion.

The Lead Read Counter #2A and Lag Read Counter #2B alternately concurrently exchange the use of the two 99% and 101% sample clock pulses from input #52 and #64. The two sampling clock pulses are fed to 2 to 1 multipliers #66 and #68, which are under the clock control, flip flops are clocked by theory outputs of counters #2A and 2B and alternately of counter #49.

The Q outputs of the above said flip flops #65 and #10 alternately enables and dis-enables the programmable function for the programmable lead and lag read address counters 2A and 2B. As these flip flops are alternately clocked by either their carry output of the respective read address counter or the carry output of counter #49, the counter #2A and 2B are allowed to "wrap around" for a complete count cycle. (From programmed start through the zero count on upward again until the next alternate reset which reprograms a new start number in the particular counter 2A or 2B. Optical buffers #62 and #63 isolate the two counters #2A and #2B.

The use of the above stated plus and minus sampling clocks accomplishes two objectives: first, external distortion feedback is completely eliminated from the audio circuit; secondly, the special relation of the sound of the two outputs generated by the delay are exponentially delayed to create a spatial relationship which creates dimensionally by exponentially expanding the delay slightly apart and inwardly (alternately a longer and shorter delays created in a pulsating fashion).

The above stated variable delay is further enhanced under control of multi programmable clock inputs of the above stated lead and lag address counters #2A and #2B. The programmable inputs are divided into 3 input number bytes of four bits each; a least significant byte, a middle byte, and a most significant byte. (This is in the program jam inputs of the counters #2A and #2B, each one being a string of three cascaded 74193 TTL counters, one for each four bit byte.)

Figure 16:
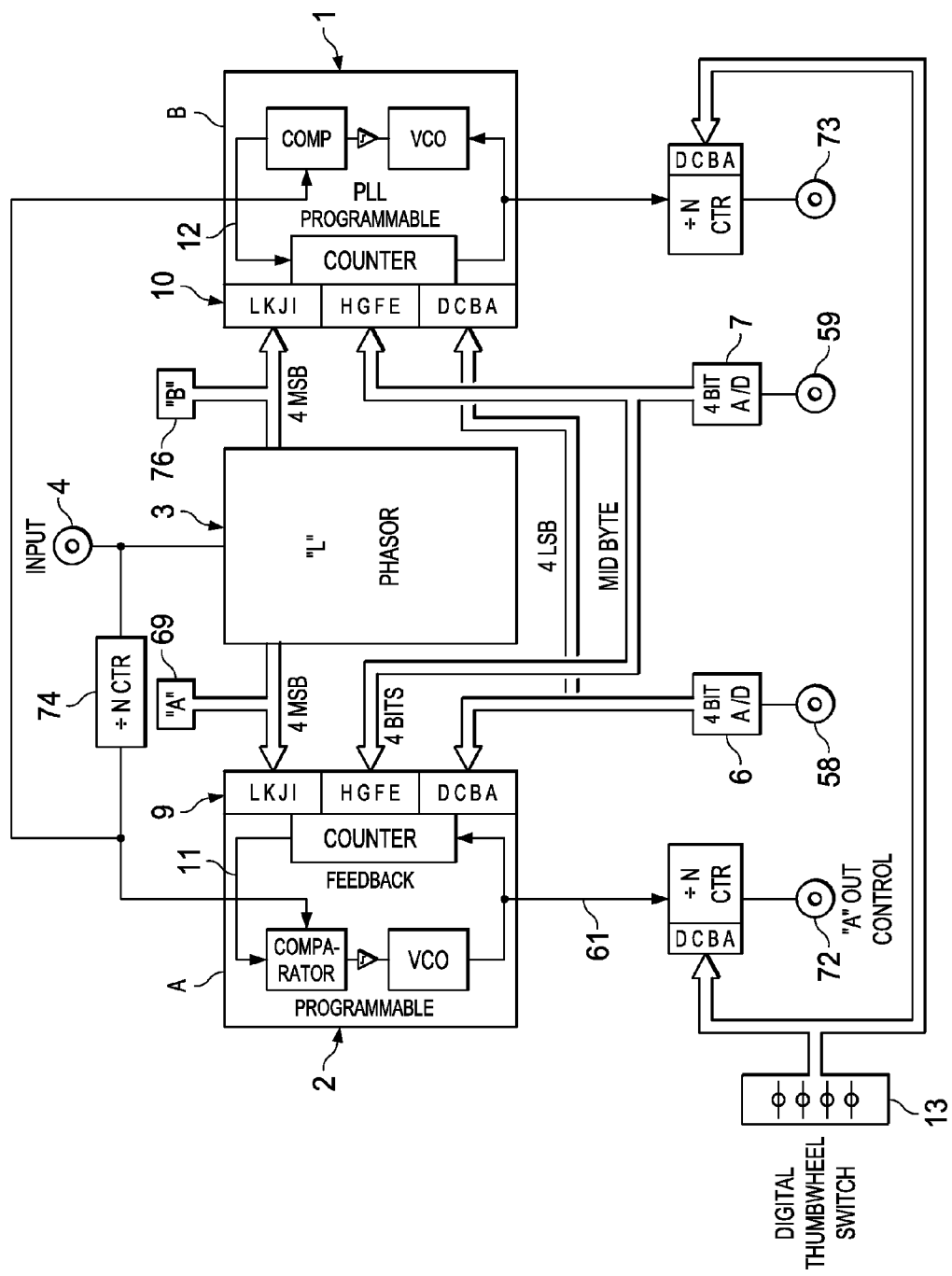
FIG. 16 is a pictorial representation of a phasor circuit in accordance with an illustrative embodiment.
Figure 17:
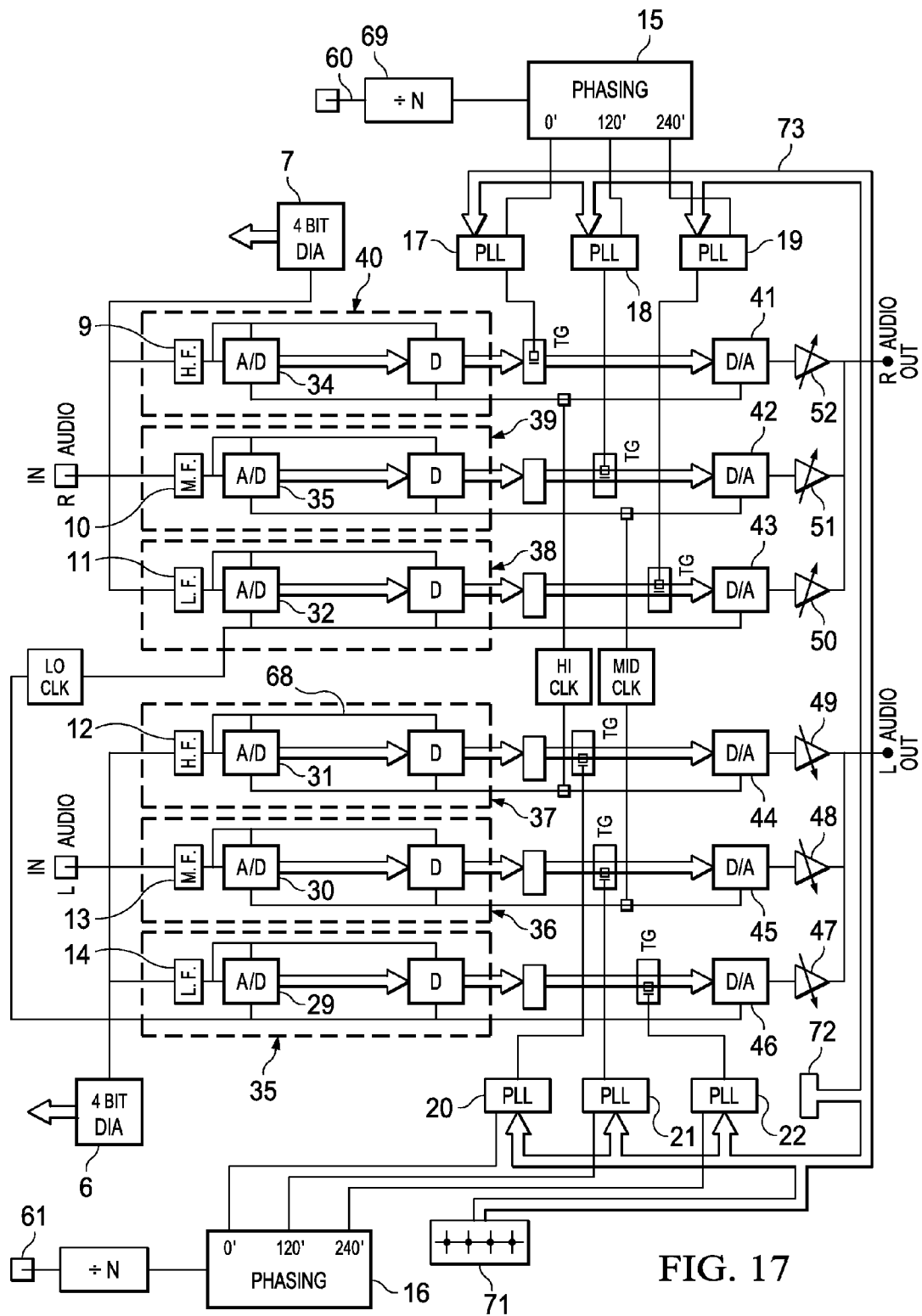
FIG. 17 is a pictorial representation of a phasor circuit in accordance with an illustrative embodiment.

The most significant bits of the above said lead and lag counters #2A and #2B, are programmed by output of digital thumbwheel switch #18 which is buss connected to the jam inputs of the two counters, which programs the two counters to read a certain number of registers behind the master write counter and apart from each other to give a programmed delay. The phase difference between the two read out counters is also enhanced by the mid and least significant bytes of the said counters. The mid bytes being programmed by the left and right outputs (#6 and #7 of FIG. 16) of the "L" phaser of FIG. 14B, via inputs 9A and 9B.

The least significant bits to the programmable jam inputs of the said counters #2A and #2B are programmed by outputs of four bit analog to digital converters #11 and #12. These A/D converters read the output signals of audio frequency comparators #13C and #59. These comparators produce a voltage output reactive to the frequency of its input versus the frequency of the sampling clocks imputed to give a reactive quotient output relative to the two frequencies. Based on a discovery by the inventors that, the higher the frequency of count the faster it travels; thus effecting echo and reverberation with respect to frequency and volume, making higher pitches have less reverb time. Thus an assumption was made that additional or less delay should be programmed by a function of frequency. To accomplish this, the output busses #25 and #24 are digitally inverted by byte wide inverters #24A and #25A. So we now are programming the lead and lag read counters #2A and #2B to be responsive to manual setting by digital thumbwheel switches 18A and 18B to program the basic delay from the master register counter in the most significant bytes, holographic "L" phasing in the mid-bytes, and an additional small delay which a reverse function of frequency in the least significant bytes; with the difference between digital switches #18A and #18B, determining the primary lag between the lead and lag read #2A and #2B, which is additionally variable by the extent of the programming of the mid and least significant bytes, to determine the spatial relationship of the final audio outputs #38 and #41 to each other.

The multiple addressable dual readout ram has 4096 registers organized into 32 12 bit bytes per register. These registers are accessed almost simultaneously, as enabled by a tri-phased generator which is clocked by the master sample clock (#2A of FIG. 15) and inputted at input #3. The 0, 120 and 240 degree outputs of this tri-phased generator #51 are connected to the master write, lead read and lag read enable inputs of the said multiple access ram #1. The leading edge of these phased pulses enables the timing of the write and two read functions. The 120 degree phase output clocks the master numerical word byte write function, from master analog to digital converter #8. Tri-phased generator #51 directs traffic for the master input buss #8A, and the two read and lag output busses #16 and #15. The 120 degree phase output clocks the master write byte into the ram at the address pointed to by the write address counter #45 and the byte counter #4. The 240 degree phase pulse enables the lead read function, to read out the byte onto buss #29 which the lead read counter and byte counter pointers are indicating. The 0 degree phase pulse enables the lag read function, to read out the byte onto buss #29 which the lag read counter and byte counter pointers are indicating.

Figure 15:
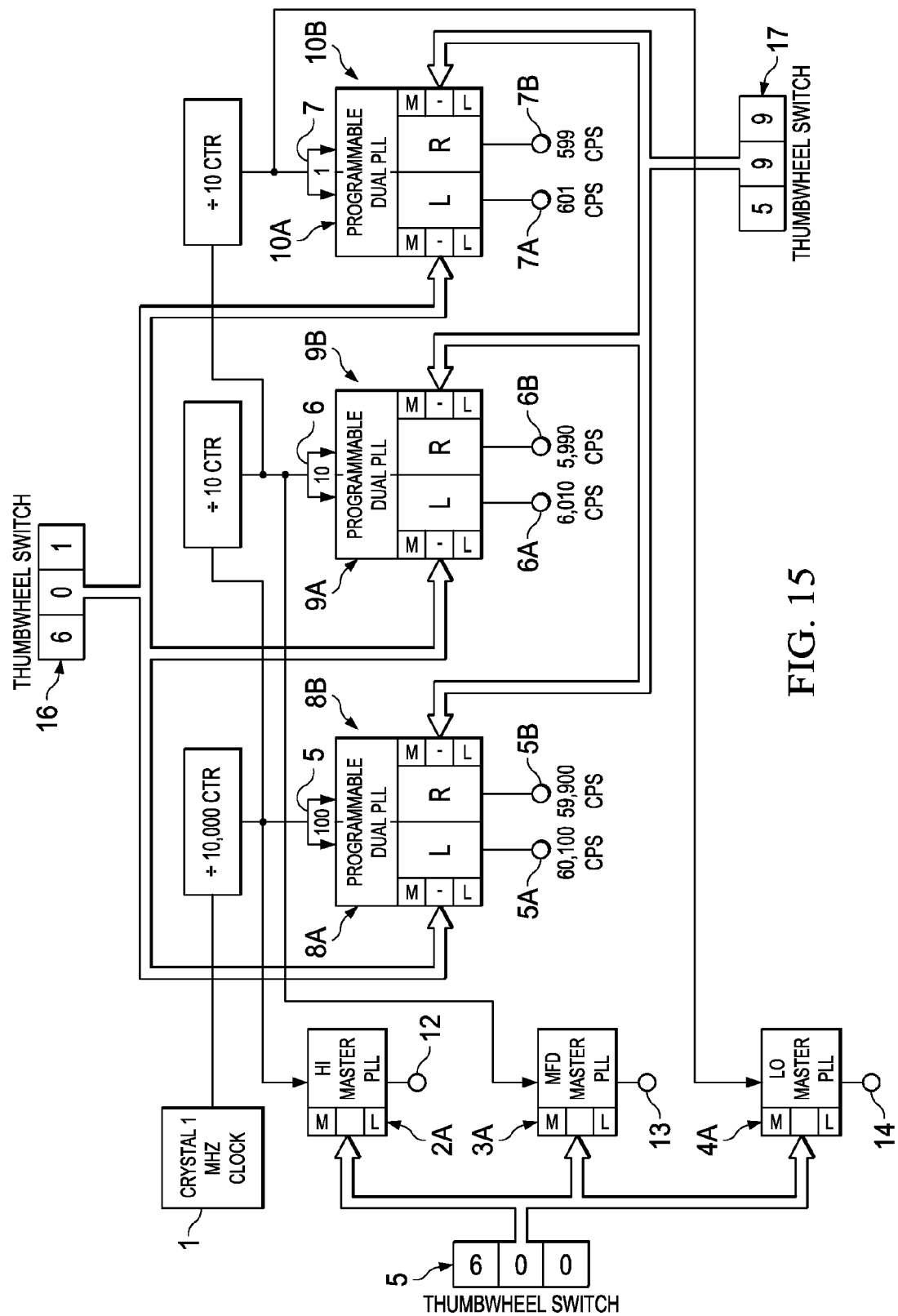
FIG. 15 is a pictorial representation of sampling clock generators in accordance with an illustrative embodiment.

The Lead Read Digital to Analog converter #42 is clocked by the output of two to one multiplexer #65 which alternately feeds either the 99 or 101 percent sampling clocks imputed at #62 and #64. (The sampling clock generators are shown in FIG. 15) Its analog output is buffered by variable optical buffer #37 whose output is fed back to the input of the master write analog to digital converter #8 to introduce a measured amount of delayed echo from the 1st outputted audio channel line #38.

The Lag Read Digital to Analog converter #39 is clocked by the output of two to one multiplexer #65 which alternately feeds either the 99 or 101 percent sampling clocks imputed at #62 and #64. (The sampling clock generators are shown in FIG. 15) Its analog output is buffered by variable optical buffer #40 and fed back to the input of the master write analog to digital converter #8 (after being optically buffered again by optical buffer #43 to keep the two audio channels #38 and #41 isolated from each other) to introduce a measured amount of delayed echo from the 2nd outputted audio channel line #38. The result is spatially dimensional dual echo delayed reverberation which is holographic in nature because of the buffered interference patterns of the audio as it is remixed by optical buffer #37 and #43 and fed back into the audio envelope before it is redigitized by master A/D converter #8. Either of the lead or lag digital outputs #47 and #50 or the channel 1 and 2 outputs #38 and #41 are spatially phased differently from each other and are dimensionally delayed at different phased delays and then both contain selected diminishing delayed echo portions of the lead and lag audio channels, to give two audio channels for one original audio component, which are spatially opposed to each other, each being a complete holographic dimensional audio component within itself.

What is claimed is:

1. A holographic muting lens camera system comprising:
    a dual axis four lens system operable to be angularly adjusted to receive light along a first optical axis, a second optical axis, a third optical axis, and a fourth optical axis respectively;
    four LCD switching elements operable to receiving light through the dual axis four lens system;
    a pair of LCD switched dual filtered dichroic mirrors positioned to receive light from the first optical axis and the fourth optical axis;
    a pair of half silvered dichroic color filter elements for receiving light along the second optical axis and the third optical axis positioned in an inverted v-shape at a 90 degree angle; and
    two charge coupled device (CCD) pickups operable to receive light along the second optical axis and the third optical axis being spaced apart and substantially parallel, wherein the light from the second optical axis and the third optical axis is combined with light received along the first axis and fourth axis respectively through a plurality of half silvered mirrors for processing by the CCD pickups, wherein the plurality of half silvered mirrors are operable to reflect light received through the first optical axis, the second optical axis, the third optical axis, and the fourth optical axis reflected or communicated through the four LCD switching elements, the pair of LCD switched dual filtered dichroic mirrors, and the pair of half silvered dichroic filter elements to produce optical disparity for dimension.

2. The system of claim 1, further comprising:
    holographic muting circuitry for processing the signals generated by the two CCD pickups for output to one or more displays.

3. The system of claim 1, wherein the pair of LCD switched dual filtered dichroic mirrors are half silvered, separated by a distance, and are positioned at 45 degree angles to a horizontal plane of the lens system in an open position facing each other.

4. The system of claim 1, the first optical axis and the fourth optical axis are minutely angled to each other in a horizontal plane to produce the optical disparity.

5. The system of claim 1, wherein light enters the fours lens system in a first phase, a second phase, a third phase and a fourth phase.

6. The system of claim 1, wherein a first lens and a fourth lens of the dual axis four lens system are angled together utilizing one or more worm gears, and wherein the worm gears control the horizontal positioning of the pair of LCD switched dual filtered dichroic mirrors, and a distance to a front of the system for the half silvered dichroic color filter elements.

7. The system of claim 6, wherein the worm gears are digital step controlled to a synchronized zoom function control of the dual axis four lens system, the dual axis four lens system being synchronously focused and aperture controlled.

8. The system of claim 1, wherein the first optical axis and the fourth optical axis are primary phased light paths, and the second optical axis and the third optical axis are secondary phased light paths.

9. The system of claim 1, wherein the pair of LCD switched dual filtered dichroic mirrors are either full plane opaque or optically transparent for a pulse duration of a flip flop.

10. The system of claim 1, wherein the pair of half silvered dichroic color filter elements include two sheets of coated glass, a first sheet of the coated glass including a primary color filter gel coating on the front and a half silvered mirror coating on the back, a second sheet of the coated glass including a primary color filter gel coating on the front and a fully silvered mirror coating on the back, a full plate LCD optical switch being sandwiched between the first sheet and the second sheet.

11. The system of claim 1, wherein that light of the first optical axis is yellow filtered and combined with a blue filtered light beam from the third optical axis through the plurality of half silvered mirrors to one of the two CCD pickups, and wherein the light of the second optical axis is green filtered and combined with light of the fourth optical axis to be processed by one of the two CCD pickups.

12. The system of claim 1, further comprising:
   a vision hood wearable by a user for viewing video processed by the system.

* * * * *